US012652204B2

(12) United States Patent
Paro Filho et al.

(10) Patent No.: US 12,652,204 B2
(45) Date of Patent: Jun. 9, 2026

(54) SYSTEM AND METHOD FOR MULTIPLE SUPPLY IQ SHARING IN DIGITAL TO ANALOG SIGNAL CONVERSION

(71) Applicant: Instituto de Pesquisas Eldorado, Campinas (BR)

(72) Inventors: Pedro Emiliano Paro Filho, San Diego, CA (US); Eduardo Rodrigues De Lima, Campinas (BR)

(73) Assignee: Instituto de Pesquisas Eldorado, Campinas (BR)

( * ) Notice: Subject to any disclaimer, the term of this patent is extended or adjusted under 35 U.S.C. 154(b) by 107 days.

(21) Appl. No.: 18/925,572

(22) Filed: Oct. 24, 2024

(65) Prior Publication Data

US 2026/0121895 A1      Apr. 30, 2026

(51) Int. Cl.
*H04L 27/12* (2006.01)
*H04L 25/49* (2006.01)
*H04L 27/20* (2006.01)

(52) U.S. Cl.
CPC ........ *H04L 27/125* (2013.01); *H04L 25/4921* (2013.01); *H04L 27/2082* (2013.01)

(58) Field of Classification Search
CPC ........................ H04L 27/125; H04L 25/4921; H04L 27/2082
See application file for complete search history.

(56) References Cited

U.S. PATENT DOCUMENTS 6,029,059 A * 2/2000 Bojer ................... H03D 7/1458
                                                          455/333
6,342,812 B1 1/2002 Abdollahian et al.
8,451,941 B2 5/2013 Zhu et al.
(Continued)

FOREIGN PATENT DOCUMENTS

CN          104601259 B      4/2017
WO     WO2013127141 A1      9/2013

OTHER PUBLICATIONS

Si-Wook Yoo et al., "A Watt-Level Quadrature Class-G Switched-Capacitor Power Amplifier with Linearization Techniques," IEEE Journal of Solid-State Circuits, vol. 54, No. 5, May 2019, pp. 1274-1287, IEEE, USA.
(Continued)

*Primary Examiner* — Jean B Corrielus
(74) *Attorney, Agent, or Firm* — André Grouwstra

(57) ABSTRACT

A digital to analog signal conversion system with a local oscillator, a control circuit, a radio-frequency digital to analog converter circuit, and a power combiner circuit is presented. The local oscillator generates a plurality of local oscillator phase signals. The control circuit receives a baseband in-phase (I) signal and a baseband quadrature (Q) signal and generates a plurality of control signals. The radio-frequency digital to analog converter circuit includes first and second pluralities of switch units that generate positive and negative radio-frequency signals respectively, based on the plurality of local oscillator phase signals and the plurality of control signals. The power combiner circuit generates a radio-frequency output signal based on a combination of the positive radio-frequency signal from the first plurality of switch units and the negative radio-frequency signal from the second plurality of switch units.

20 Claims, 10 Drawing Sheets

(56) References Cited

U.S. PATENT DOCUMENTS

| | | | |
|---|---|---|---|
| 8,477,857 B2 | 7/2013 | Osman et al. | |
| 8,648,657 B1 * | 2/2014 | Rozenblit | H03F 1/0238 |
| | | | 330/133 |
| 9,800,452 B2 * | 10/2017 | Lehtinen | H04B 1/04 |
| 10,200,232 B1 | 2/2019 | Wentzloff et al. | |
| 10,454,509 B2 * | 10/2019 | Asuri | H03F 3/211 |
| 10,686,476 B1 * | 6/2020 | Mehdizad Taleie | H03M 1/662 |
| 10,804,864 B2 | 10/2020 | Yoo et al. | |
| 11,211,908 B2 | 12/2021 | Taylor | |
| 11,349,514 B2 | 5/2022 | Cho et al. | |
| 2007/0146044 A1 * | 6/2007 | Igarashi | H03B 27/00 |
| | | | 327/359 |
| 2015/0094004 A1 * | 4/2015 | Vora | H03D 7/1466 |
| | | | 455/114.1 |
| 2019/0312604 A1 * | 10/2019 | Huang | H03F 3/68 |
| 2025/0141721 A1 * | 5/2025 | Shan | H04B 1/40 |

OTHER PUBLICATIONS

Lei Chen, "High Efficiency IQ-Sharing Transmitter," Master of Science Thesis, Delft University of Technology, Oct. 25, 2016, Delft, Netherlands.

* cited by examiner

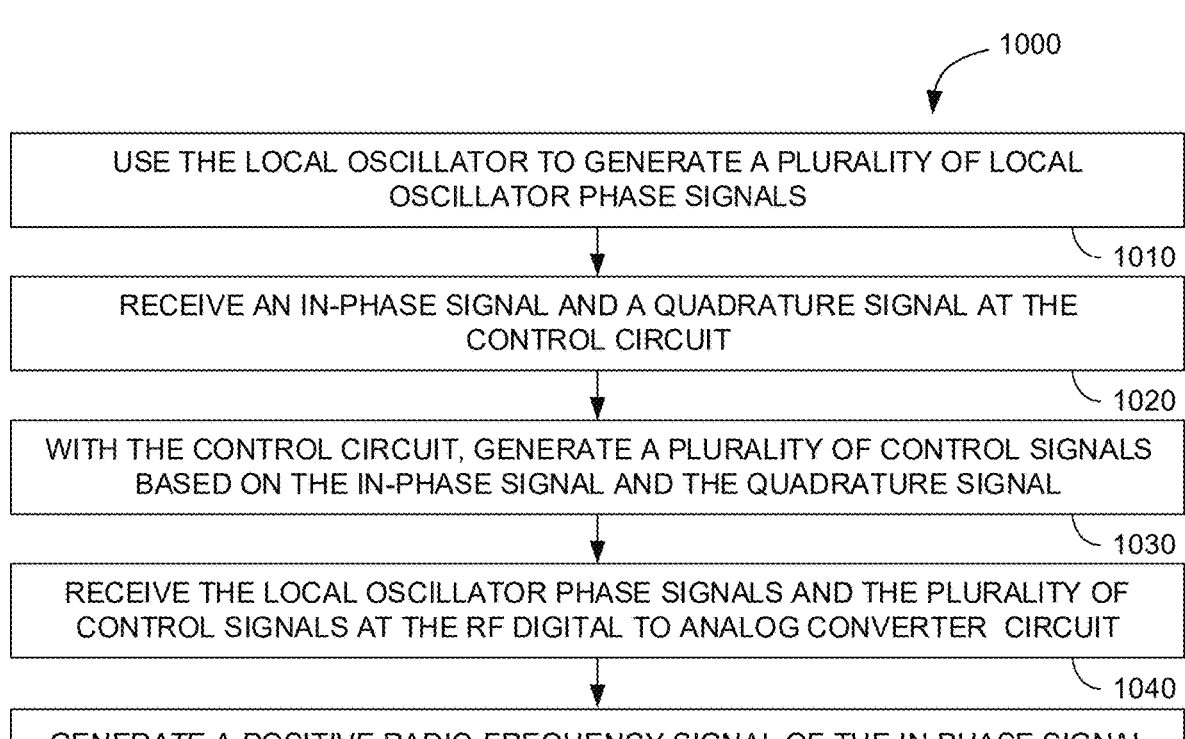

1000

USE THE LOCAL OSCILLATOR TO GENERATE A PLURALITY OF LOCAL OSCILLATOR PHASE SIGNALS

1010

RECEIVE AN IN-PHASE SIGNAL AND A QUADRATURE SIGNAL AT THE CONTROL CIRCUIT

1020

WITH THE CONTROL CIRCUIT, GENERATE A PLURALITY OF CONTROL SIGNALS BASED ON THE IN-PHASE SIGNAL AND THE QUADRATURE SIGNAL

1030

RECEIVE THE LOCAL OSCILLATOR PHASE SIGNALS AND THE PLURALITY OF CONTROL SIGNALS AT THE RF DIGITAL TO ANALOG CONVERTER CIRCUIT

1040

GENERATE A POSITIVE RADIO-FREQUENCY SIGNAL OF THE IN-PHASE SIGNAL AND THE QUADRATURE SIGNAL IN THE FIRST PLURALITY OF SWITCH UNITS AND A NEGATIVE RADIO-FREQUENCY SIGNAL OF THE IN PHASE SIGNAL AND THE QUADRATURE SIGNALIN THE SECOND PLURALITY OF SWITCH UNITS BY SELECTING IN FIRST SWITCH UNITS OF THE FIRST PLURALITY OF SWITCH UNITS AND ASSOCIATED SECOND SWITCH UNITS IN THE SECOND PLURALITY OF SWITCH UNITS ONE OF A FIRST VOLTAGE, A SECOND VOLTAGE, OR GROUND BASED ON AT LEAST A FIRST CONTROL SIGNAL OF THE PLURALITY OF CONTROL SIGNALS, SELECTING, IN THE FIRST SWITCH UNITS OF THE FIRST PLURALITY OF SWITCH UNITS, TWO LOCAL OSCILLATOR PHASE SIGNALS OF THE LOCAL OSCILLATOR PHASE SIGNALS BASED ON AT LEAST A SECOND CONTROL SIGNAL OF THE PLURALITY OF CONTROL SIGNALS, AND SELECTING, IN THE SECOND SWITCH UNITS OF THE SECOND PLURALITY OF SWITCH UNITS, TWO LOCAL OSCILLATOR PHASE SIGNALS OF THE LOCAL OSCILLATOR PHASE SIGNALS BASED ON AT LEAST A THIRD CONTROL SIGNAL OF THE PLURALITY OF CONTROL SIGNALS

1050

WITH THE POWER COMBINER CIRCUIT, GENERATE A RADIO-FREQUENCY OUTPUT SIGNAL BASED ON A COMBINATION OF THE POSITIVE RADIO-FREQUENCY SIGNAL FROM THE FIRST PLURALITY OF SWITCH UNITS AND THE NEGATIVE RADIO-FREQUENCYSIGNAL FROM THE SECOND PLURALITY OF SWITCH UNITS

SYSTEM AND METHOD FOR MULTIPLE SUPPLY IQ SHARING IN DIGITAL TO ANALOG SIGNAL CONVERSION

BACKGROUND

The present invention is in the field of digital to analog signal conversion, in particular in the field of multiple supply baseband in-phase and quadrature (IQ) sharing in digital to analog signal conversion and transmission.

Digital to analog signal conversion has many applications including the conversion of digital audio signals, digital video signals, and digital radio-frequency (RF) signals into analog audio signals, analog video signal, and analog RF signals.

In particular, RF digital to analog signal conversion systems have been widely investigated for their use in wireless signal transmission applications due to ever increasing data traffic and communication speeds in signal transmission applications and further evolving wireless communication standards.

A wireless signal transmission system typically receives digital signals, uses a digital to analog signal converter to convert the digital signals into analog signals and an RF power amplifier, which usually is the last component before the antenna. Different power amplifier classes exist and letter symbols are applied to different power amplifier types (e.g., Class-A, Class-B, Class-C, etc.). Class-G amplifiers provide several power rails at different voltages and switches between these voltages to increase the average efficiency for signals with high peak-to-average power ratio (PAPR).

BRIEF DESCRIPTION OF THE DRAWINGS

The invention will be described with reference to the drawings, in which:

FIG. 10 illustrates a method of operating a digital to analog signal conversion system with control circuit, RF digital to analog converter circuit, power combiner circuit, and local oscillator.

DETAILED DESCRIPTION

Power amplifiers include traditional analog power amplifiers and digital power amplifiers. A digital power amplifier (DPA) usually unites the functionality of an up-conversion mixer and a digital-to-analog converter (DAC) in the power amplifier. Therefore, digital power amplifiers are sometimes also referred to as radio frequency (RF) power DACs. Digital power amplifiers typically include several unit cells, and the output power of these unit cells is combined according to a digital input signal.

In recent years, switched capacitor power amplifiers (SCPA) have emerged as an alternative digital power amplifier for RF signal power amplification. A switched capacitor power amplifier includes a capacitor array and several switching power amplifiers that are connected in parallel and act as a voltage source for the capacitor array. In a dual-voltage implementation, the switches of the SCPA are often toggled between ON voltage (VDD) and ground (GND) and/or between twice the ON voltage (2×VDD) and ground (GND), whereby both VDD and 2×VDD can be used at different unit capacitors to generate different output power levels. A switched capacitor power amplifier often has a small size, high linearity, and high efficiency.

A modulated analog signal can be synthesized by combining the in-phase (I) and quadrature (Q) components of a sine wave that are in quadrature phase (i.e., having a phase offset of 90 degrees), whereby modulating the amplitude of the I and Q components and adding them allows to produce an amplitude and phase modulated carrier signal. The most utilized implementations for producing such an amplitude and phase modulated carrier signal includes two independent digital to analog signal converters, one for the in-phase component and one for the quadrature component. However, since the cost efficiency and low power consumption of wireless signal transmission systems are increasingly important, especially for wearable applications, such implementations are not cost effective.

To improve the cost efficiency, several architectures have been proposed that allow a single digital to analog converter to concurrently produce both in-phase and quadrature signal components to save area. This is sometimes also referred to as "IQ sharing" or "IQ combining". At the same time, multiple solutions and power amplifier operation classes (e.g., Class-D, Class-E) have been proposed to address the poor power efficiency in face of large peak-to-average power ratio (PAPR) modulated signals. However, neither solution addresses both aspects, namely cost efficiency and power efficiency.

Therefore, it is an objective to provide a new digital to analog signal conversion system that is both cost efficient and power efficient, while providing a single frontend.

Figure 1:
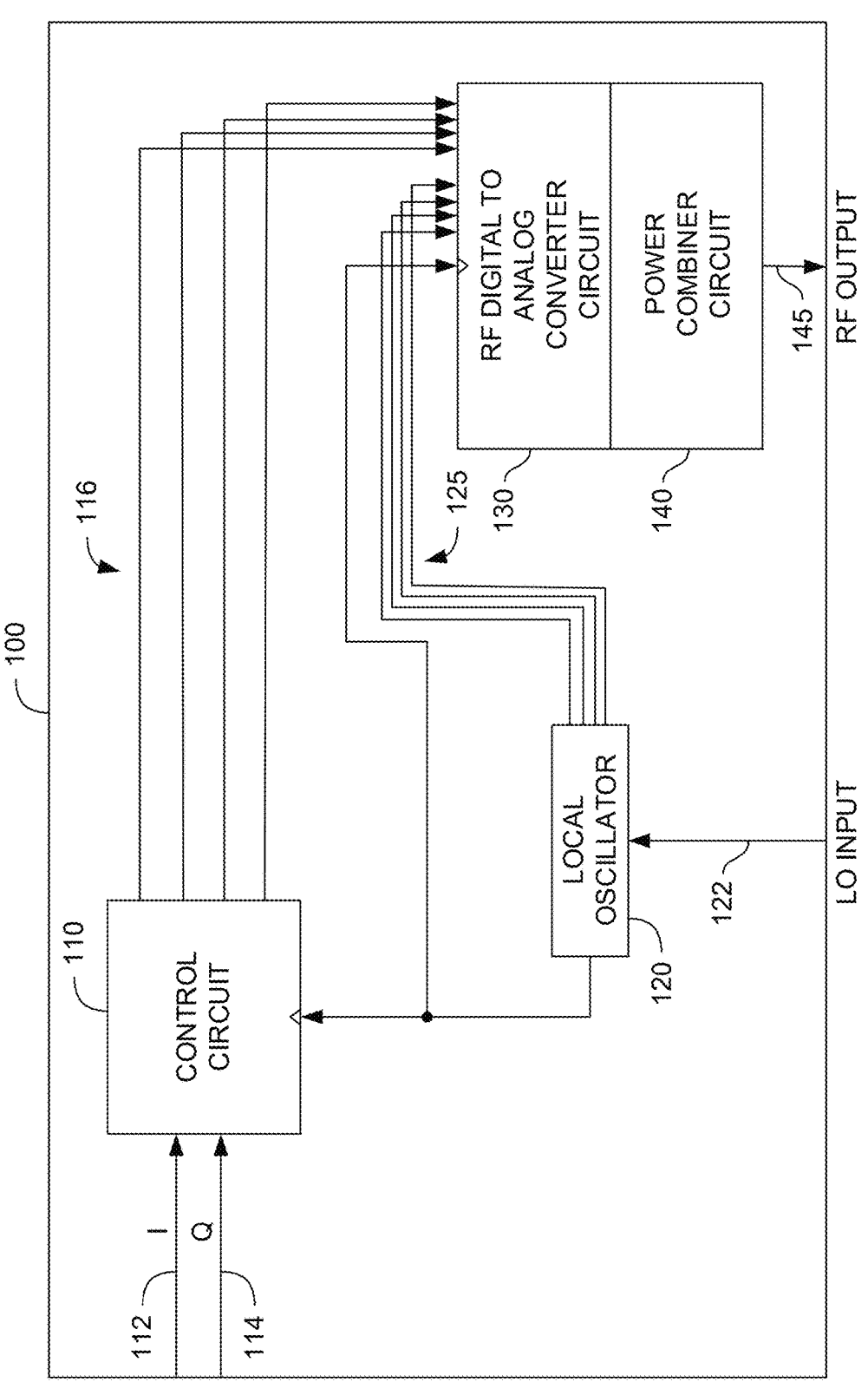
FIG. 1 illustrates a digital to analog signal conversion system with control circuit, RF digital to analog converter circuit, power combiner circuit, and local oscillator.

FIG. 1 shows an illustrative digital to analog signal conversion system 100. The digital to analog signal conversion system includes a control circuit 110, a local oscillator 120, a radio-frequency (RF) digital to analog converter (DAC) circuit 130, and a power combiner circuit 140. The local oscillator 120 receives an input signal 122 and generates a plurality of local oscillator phase signals 125 as illustratively shown hereinafter in the example implementation of FIG. 8A.

The RF digital to analog converter circuit 130 receives the local oscillator phase signals 125 and a plurality of control signals 116. The RF digital to analog converter circuit 130 includes a first plurality of switch units that generates a positive radio-frequency signal based on the plurality of local oscillator phase signals 125 and the plurality of control signals 116. The RF digital to analog converter circuit 130 also includes a second plurality of switch units that generates a negative radio-frequency signal based on the plurality of local oscillator phase signals 125 and the plurality of control signals 116. The RF digital to analog converter circuit 130 is illustratively shown hereinafter in the example implementation of FIG. 2. The first and second pluralities of switch units are illustratively shown hereinafter in the example implementation of FIG. 3.

The power combiner circuit 140 generates a radio-frequency output signal 145 based on a combination of the positive radio-frequency signal from the first plurality of switch units and the negative radio-frequency signal from the second plurality of switch units.

The control circuit 110 receives a baseband in-phase (I) signal 112 at a first input port and a baseband quadrature (Q) signal 114 at a second input port and generates the plurality of control signals 116 based on the baseband in-phase signal 112 and the baseband quadrature signal 114. Illustratively, as part of control signals 116, the control circuit 110 may provide enable or disable signals and control signals for selecting a voltage in the switch units of the RF digital to analog converter circuit 130, and/or the control circuit 110 may provide a control signal for selecting one of the plurality local oscillator phase signals 125 in the different switch units of the RF digital to analog converter circuit 130.

Figure 7:
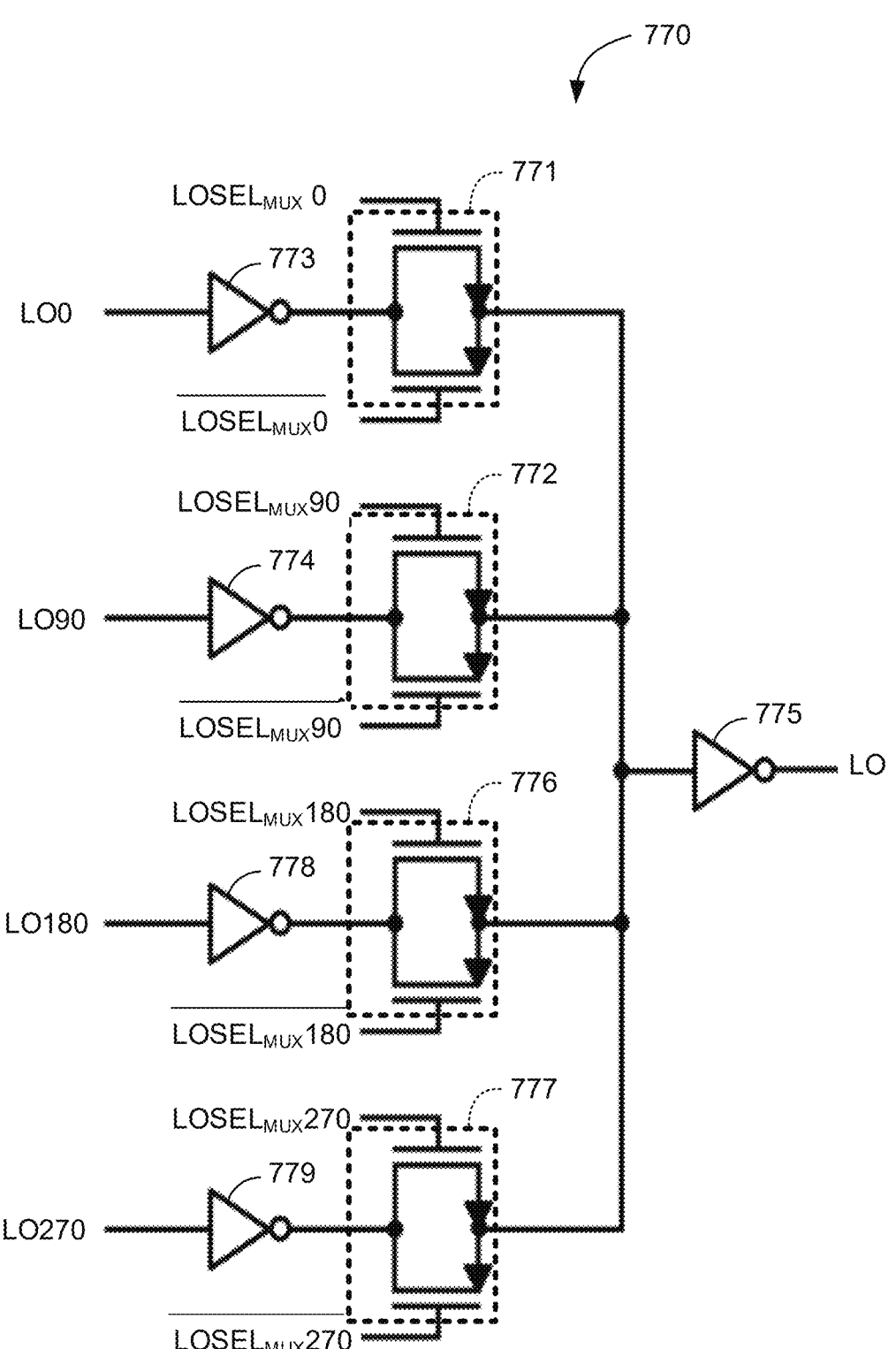
FIG. 7 illustrates an example local oscillator phase signal selector circuit.

In particular, the control circuit 110 includes a local oscillator signal selector circuit such as for example local oscillator signal selector circuit 770 of FIG. 7 that is configured to generate first control signals that select for each switch unit of the first and second pluralities of switch units one of the four oscillator signals for encoding the baseband in-phase signal and another one of the four oscillator signals for encoding the baseband quadrature signal.

The control circuit 110 further includes a voltage selector circuit that is configured to generate second control signals that select for each switch unit of the first and second pluralities of switch units to connect a single one of a first voltage, a second voltage, or ground to an output port of the respective switch unit based on the baseband in-phase signal and the baseband quadrature signal, wherein the second voltage is twice the first voltage.

Figure 2:
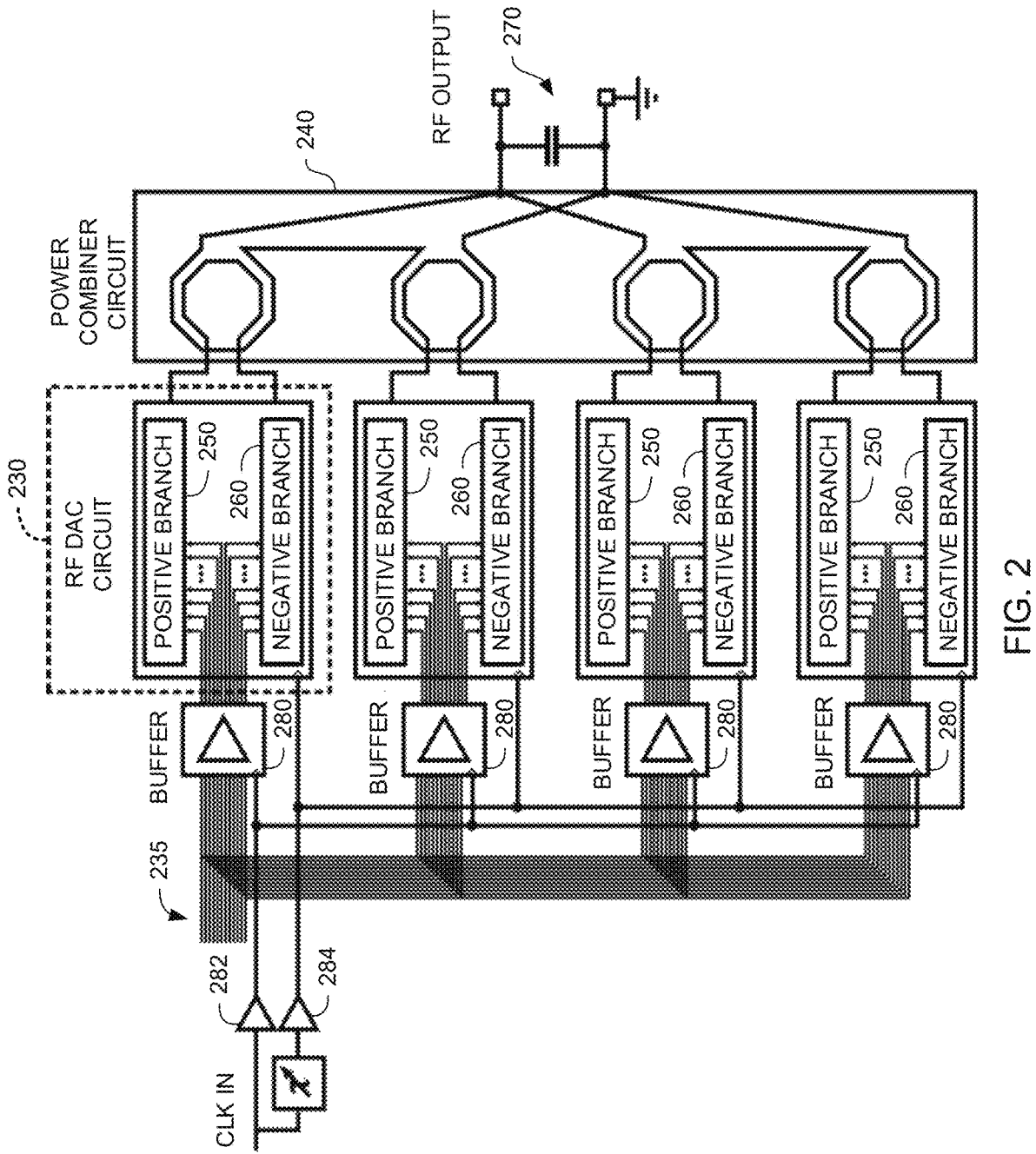
FIG. 2 illustrates example RF digital to analog converter circuits and a power combiner circuit for a digital to analog signal conversion system.

FIG. 2 illustrates an example RF digital to analog converter instance with four RF digital to analog converter (DAC) circuits 230 and a power combiner circuit 240 for a digital to analog signal conversion system such as digital to analog signal conversion system 100 of FIG. 1. Illustratively, a RF digital to analog converter circuit 230 receives a clock signal 284 and the local oscillator phase signals as part of the data input signals 235. In some implementations, the data input signals 235 may include the control signals 116 of FIG. 1.

All signals entering the RF digital to analog converter circuit 230 are buffered. For example, buffer 280 buffers the data input signals 235. Buffer 280 may be clocked by clock signal 282, if desired. Illustratively, the buffers 280 and the clock buffers 282, 284 may include circuitry such as inverters or amplifiers. If desired, the buffers 280 may include clocked storage circuitry such as registers or memory.

As shown in FIG. 2, the RF digital to analog converter circuit 230 includes a positive branch 250 and a negative branch 260. The positive branch 250 includes a first plurality of switch units that generates a positive RF signal, and the negative branch 260 includes a second plurality of switch units that generates a negative RF signal.

At least one switch unit of the first or second pluralities of switch units includes an output port and provides at least a portion of the positive radio-frequency output signal or at least a portion of the negative radio-frequency output signal at the output port. As shown in FIG. 2, both pluralities of switch units include a respective output port, whereby the first plurality of switch units provides the positive RF signal at its output port, and the second plurality of switch units provides the negative RF signal as its output port.

The power combiner circuit 240 receives positive and negative RF signals from the RF digital to analog converter circuits 230. The power combiner circuit 240 generates an RF output signal (e.g., RF output signal 145 of FIG. 1) at the output 270 based on a combination of the positive and negative RF signals. For example, the power combiner circuit 240 may be configured to implement a sum of a first portion of a positive RF signal and a corresponding first portion of a negative RF signal when selected local oscillator phase signals have an anti-phase relationship with each other and to implement a difference of a second portion of the positive RF signal and a corresponding second portion of the negative RF signal when the selected local oscillator phase signals have an in-phase relationship with each other. This is further illustrated in the example discussed in FIG. 9.

Figure 3:
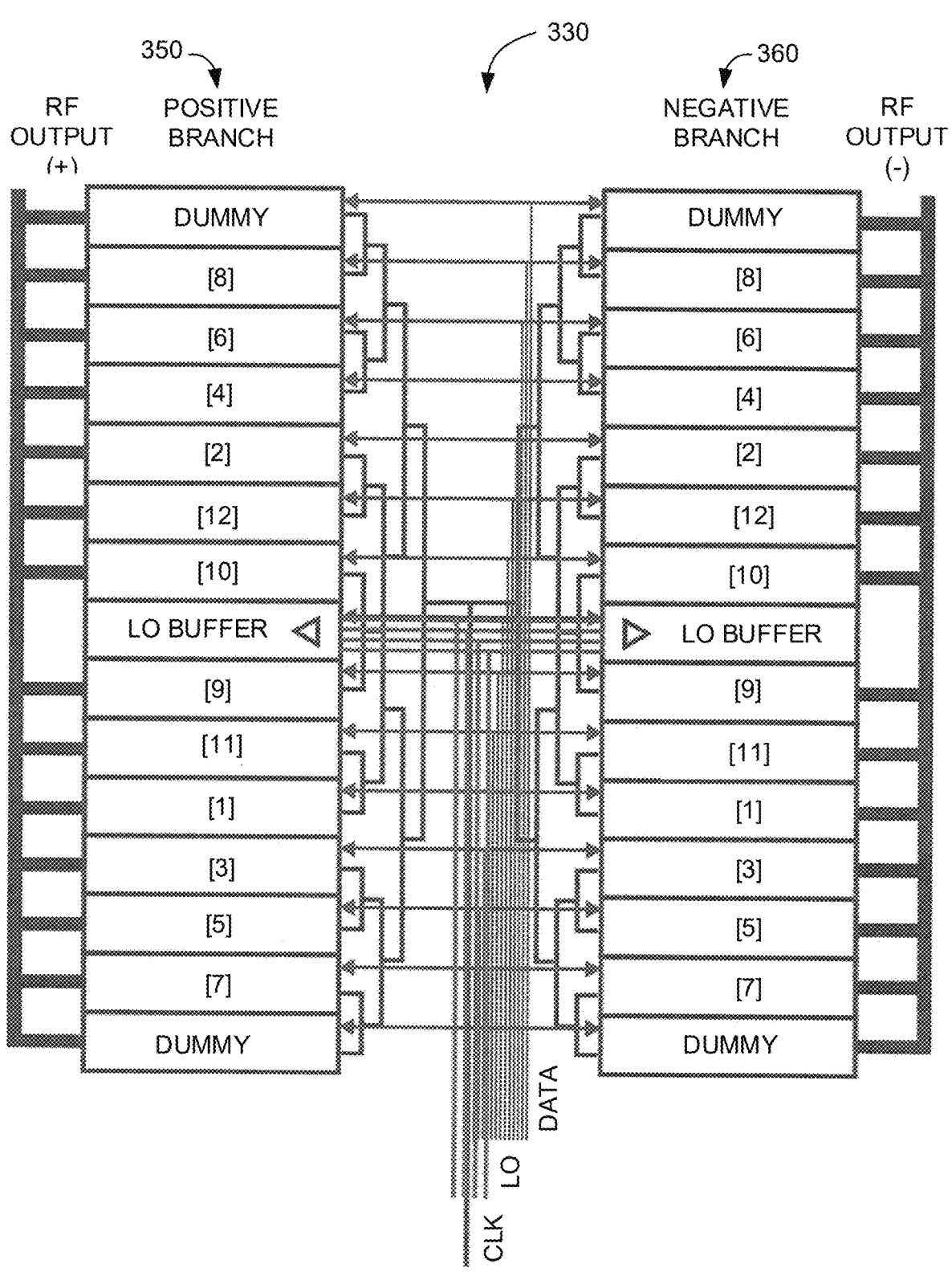
FIG. 3 illustrates an example RF digital to analog converter circuit.

FIG. 3 illustrates an example RF digital to analog converter circuit 330. Illustratively, the RF digital to analog converter circuit 330 receives a clock signal CLK, a plurality of local oscillator phase signals LO and data signal DATA. Illustratively, the clock signal CLK is distributed As shown in FIG. 3, the RF digital to analog converter circuit 330 includes two identical differential branches, a positive branch 350 and a negative branch 360. The positive branch 350 and the negative branch 360 may be operated and interconnected in differential configuration. Each one of the positive branch 350 and the negative branch 360 includes a plurality of switch units. The illustrative RF digital to analog converter circuit 330 of FIG. 3 includes 12 switch units in each one of the positive branch 350 and the negative branch 360, which are numbered from [1] to [12].

By way of example, switch units [9] to may be binary-sized unit cells that encode bit 3 to bit 0, switch units [1] to [7] may be unary-sized unit cells that encode bit 7 to bit 4, and switch unit [8] may be a sign bit. The sign bit may affect the phase selection, if desired.

In some implementations, the RF digital to analog converter circuit 330 may include more than 12 switch units in each one of the positive branch 350 and the negative branch 360. In other implementations, the RF digital to analog converter circuit 330 may include less than 12 switch units in each one of the positive branch 350 and the negative branch 360. For example, the RF digital to analog converter circuit 330 may include eight switch units in each one of the positive branch 350 and the negative branch 360.

Illustratively, each one of the positive branch 350 and the negative branch 360 may include a buffer denoted LO BUFFER for buffering the local oscillator phase signals LO. As shown in FIG. 3, the buffers LO BUFFER are placed in the middle of the positive branch 350 and in the middle of the negative branch 360. If desired, the buffers LO BUFFER may be placed at a location that is different from the middle of the positive branch 350 and in the middle of the negative branch 360 as long as the delay mismatch for reaching the different switch units from the respective buffer LO BUFFER is below a predetermined threshold.

The RF digital to analog converter circuit 330 may include a clock tree to distribute the clock signal CLK to the switch units of the positive branch 350 and the switch units of the negative branch 360. The clock tree may reduce the skew between the arrival times of the clock signal CLK at the different switch units [1] to [12]. As an example, the clock tree may be an H tree, an X tree, a fishbone clock tree, or any other suitable clock tree that delivers the clock signal CLK to the different switch units of the positive branch 350 and the negative branch 360 with skew below a predetermined threshold.

In some implementations, dummy switch unit cells may be spread across the positive branch 350 and the negative branch 360. Illustratively, the RF digital to analog converter circuit 330 of FIG. 3 includes dummy switch unit cells denoted DUMMY at the top and bottom of the positive branch 350 and the negative branch 360. The dummy switch unit cells may be included to ensure uniformity across the RF digital to analog converter circuit 330 and/or to prevent device mismatch.

The positive branch 350 generates a positive RF signal (RF OUTPUT (+)), and the negative branch 360 generates a negative RF signal (RF OUTPUT (−)). Illustratively, at least one switch unit of the switch units in the positive branch 350 or the switch units in the negative branch 360 includes an output port and provides at least a portion of the positive RF signal or at least a portion of the negative RF signal at the output port.

As shown in FIG. 3, all switch units of the positive branch 350, including the dummy switch units of the positive branch 350, and all switch units of the negative branch 360, including the dummy switch units of the negative branch 360 have an output port and may provide a portion of the positive RF signal or a portion of the negative RF signal.

The positive RF signal is a combination of the signals at the outputs of the switch units in the positive branch 350, and the negative RF signal is a combination of the signals at the outputs of the switch units in the negative branch 360. For example, the signals at the outputs of the switch units in the positive branch 350 may be concatenated to provide an 8-bit positive RF signal, and the signals at the outputs of the switch units in the negative branch 360 may be concatenated to provide an 8-bit negative RF signal.

Figure 4:
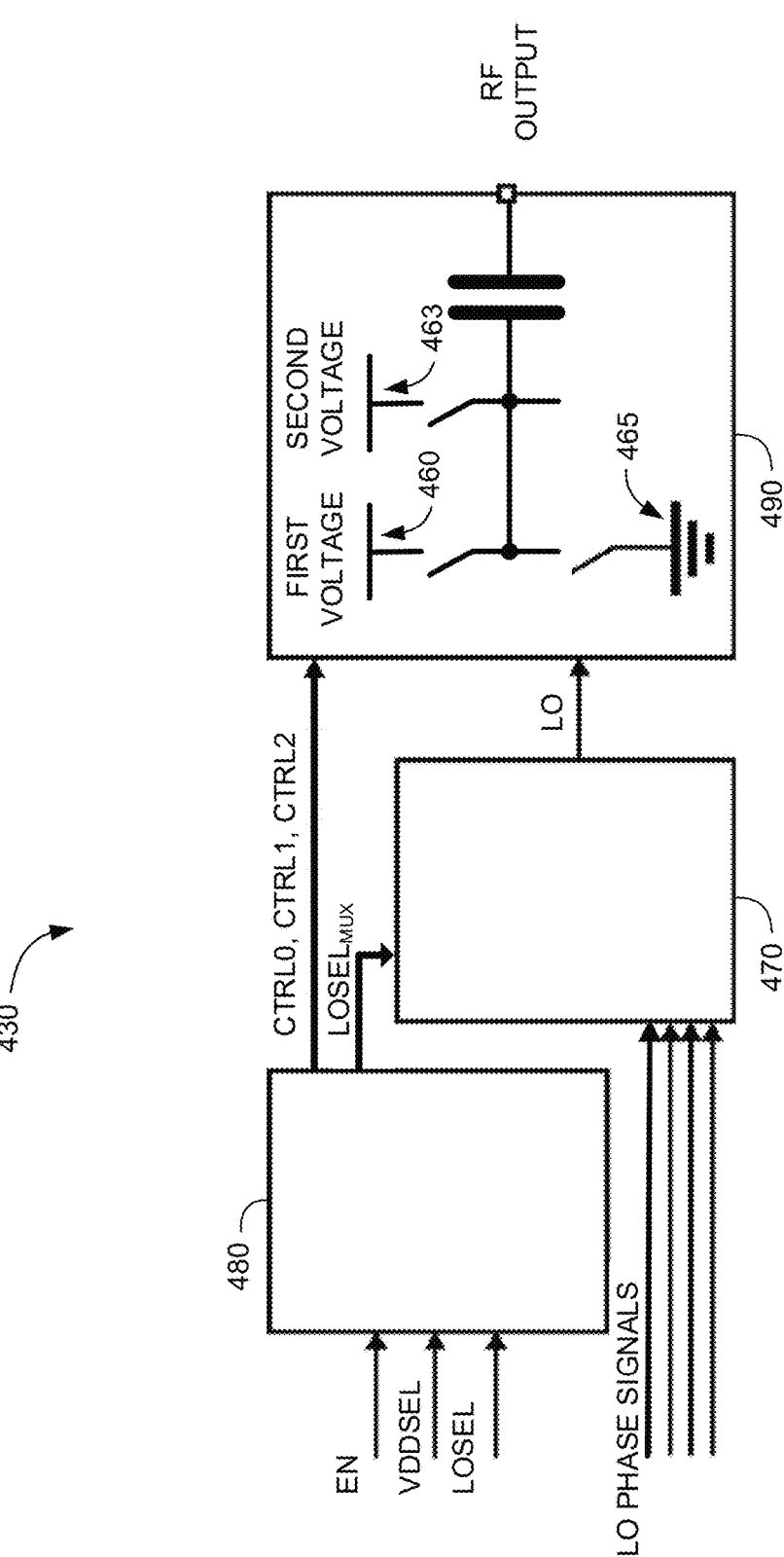
FIG. 4 illustrates an example switch unit for a RF digital to analog converter circuit.

FIG. 4 illustrates an example switch unit 430 such as one of the switch units of the positive branch 350 or the negative branch 360 of FIG. 3. As shown in FIG. 4, the example switch unit 430 may include a control circuit 480, a local oscillator phase signal selector circuit 470, and a switch cell 490.

Illustratively, the control circuit 480 may receive an enable signal EN, a voltage selector signal VDDSEL, and a local oscillator phase signal selector signal LOSEL. For example, the control circuit 480 may receive the enable signal EN, the voltage selector signal VDDSEL, and the local oscillator phase signal selector signal LOSEL from control circuit 110 of FIG. 1. In some implementations, the control circuit 480 may receive a clock signal.

In some implementations, control circuit 480 may be part of control circuit 110 of FIG. 1. In these implementations, the control circuit 110 may provide signals CTRL0, CTRL1, CTRL2 as control signals to RF digital to analog converter circuit 130 for each switch unit. In other implementations, control circuit 480 may be part of RF digital to analog converter circuit 130.

By way of example, the control circuit 480 may generate a local oscillator phase signal selector circuit control signal LOSEL$_{MUX}$ based on the local oscillator phase signal selector signal LOSEL. As shown in FIG. 4, the control circuit 480 generates control signals CTRL0, CTRL1, CTRL2 which are used to control the individual switch units (e.g., the switch units in the positive branch 350 and the negative branch 360 of FIG. 3), and thereby the voltage level in the switch cell 490. The control signals CTRL0, CTRL1, CTRL2 may be generated based on the enable signal EN and the voltage selector signal VDDSEL. An example control circuit is shown with reference to FIG. 6.

Illustratively, the local oscillator phase signal selector circuit 470 may receive a plurality of local oscillator phase signals LO PHASE SIGNALS. For example, the local oscillator phase signal selector circuit 470 may receive the local oscillator phase signals LO PHASE SIGNALS from local oscillator 120 of FIG. 1. If desired, the local oscillator phase signal selector circuit 470 may be part of RF digital to analog converter circuit 130 of FIG. 1. The local oscillator phase signal selector circuit 470 may select one or more of the local oscillator phase signals LO PHASE SIGNALS based on the local oscillator phase signal selector circuit control signal LOSEL$_{MUX}$, and provide the selected local oscillator phase signal LO to the switch cell 490. An example local oscillator phase signal selector circuit is shown with reference to FIG. 7.

The switch cell 490 may receive the control signals CTRL0, CTRL1, CTRL2 from the control circuit 480 and the selected local oscillator phase signal LO from the local oscillator phase signal selector circuit 470. As shown in FIG. 4, the switch cell 490 may include three switches. The first one of the three switches may connect a first voltage 460 to an RF output, the second one of the three switches may connect a second voltage 463 to the RF output, and the third one of the three switches may connect ground 465 to the RF output. If desired, the first voltage is a power of two of the second voltage. Thus, if the first voltage is 1V, the second voltage may be 2V, 4V, 8V, etc. or ½V, ¼V, ⅛V, etc.

The switch cell 490 is shown with three switches for three different voltages. In some implementations, the switch cell may have two switches for two voltages. In other implementations, the switch cell may have four or more switches, one for each different voltage. As an example, the switch cell may include five switches, a first switch for ground, a second switch for VDD, a third switch for 2×VDD, a fourth switch for 4×VDD, and a fifth switch for 8×VDD.

Only one of the different switches of the switch cell 490 may be set to ON (i.e., connecting the corresponding voltage level to the output), while all other switches of the switch cell 490 are set to OFF (i.e., disconnecting the corresponding voltage from the output). The switches of the switch unit 490 may be controlled by control signals CTRL0, CTRL1, CTRL2. An example switch cell 490 is shown in FIG. 5.

Figure 5:
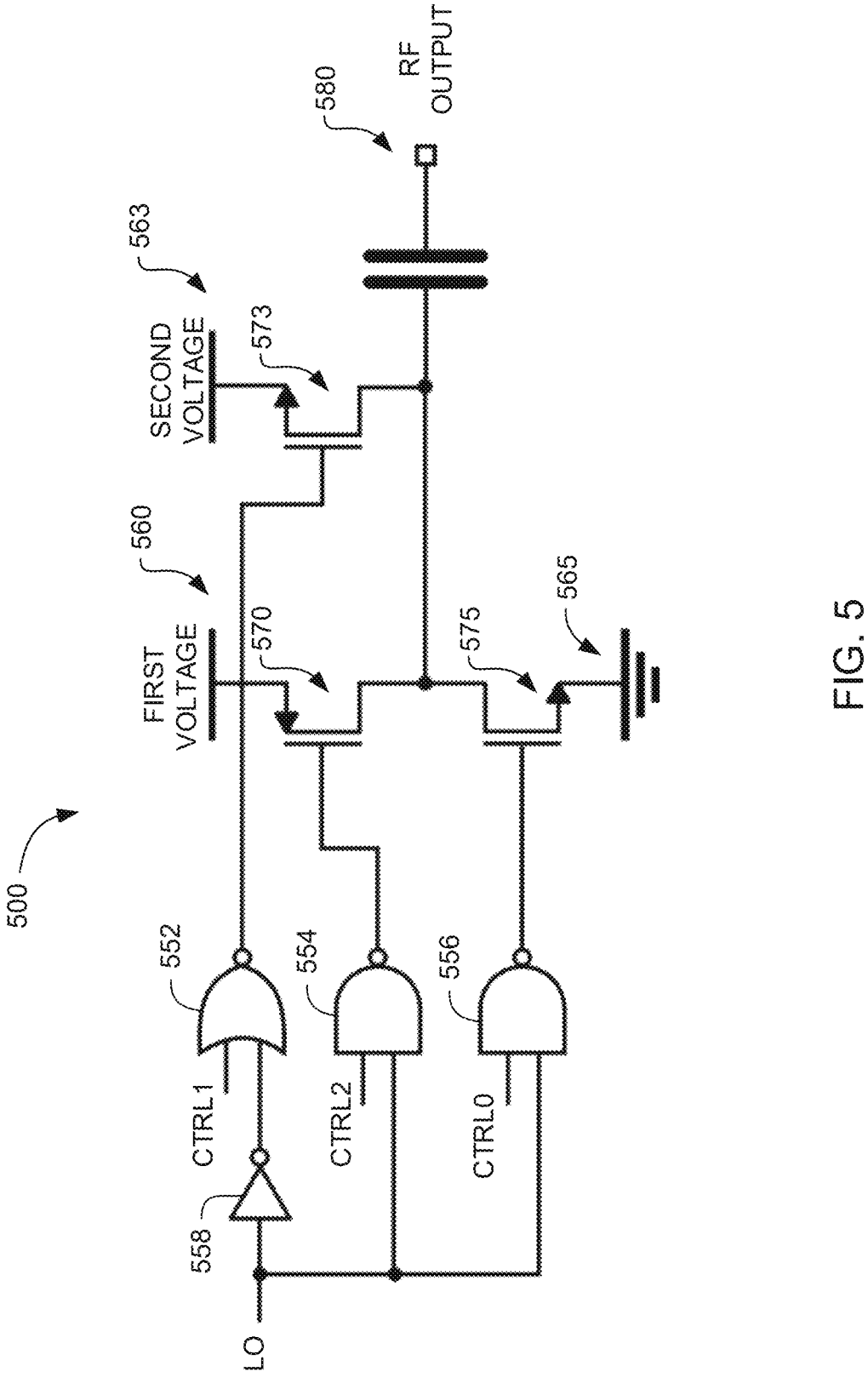
FIG. 5 illustrates an example switch cell for a switch unit.

FIG. 5 illustrates an example switch cell 500 for a switch unit such as switch cell 490 of switch unit 430 of FIG. 4. The switch cell 500 may receive the control signals CTRL0, CTRL1, CTRL2 from a control circuit (e.g., from control circuit 480 of FIG. 4) and the selected local oscillator phase signal LO from a local oscillator phase signal selector circuit (e.g., from local oscillator phase signal selector circuit 470 of FIG. 4).

As shown in FIG. 5, the switch cell 500 may include a PMOS transistor 570 and two NMOS transistors 573, 575. The PMOS transistor 570 may act as a first switch that is coupled between a first voltage rail 560 and an RF output 580. A first NMOS transistor 573 may act as a second switch that is coupled between a second voltage rail 563 and the RF output 580, and a second NMOS transistor 575 may act as a third switch that is coupled between ground 565 and the RF output 580. If desired, the first voltage is a power of two of the second voltage. For example, if the first voltage is 1V, the second voltage may be 2V, 4V, 8V, etc. or ½V, ¼V, ⅛V, etc.

Illustratively, the switch cell 500 may include a selection circuit. The selection circuit may couple only one of the first voltage rail 560 and thus the first voltage, the second voltage rail 563 and thus the second voltage, or ground 565 with the RF output 580. For example, the selection circuit may couple only one of the first voltage rail 560 and thus the first voltage, the second voltage rail 563 and thus the second voltage, or ground 565 with the RF output 580 based on one or more of the control signals CTRL0, CTRL1, CTRL2, and/or the selected local oscillator phase signal LO.

FIG. 5 shows an illustrative selection circuit with inverter 558, NOR gate 552, and NAND gates 554, 556. The illustrative selection circuit may receive the selected local oscillator phase signal LO and control signals CTRL0, CTRL1, CTRL2. In a first scenario in which CTRL0 is zero, CTRL1 is one, and CTRL2 is zero, NMOS transistor 575 is ON and PMOS transistor 570 and NMOS transistor 573 are OFF such that the RF output 580 is coupled to ground 565 and decoupled from the first voltage rail 560 and the second voltage rail 563.

In a second scenario in which CTRL0 is one, CTRL1 is one, and CTRL2 is one, NMOS transistor 575 is ON when LO is zero, PMOS transistor 570 is ON when LO is one, and NMOS transistor 573 is OFF such that the RF output 580 is coupled to the first voltage rail 560 and decoupled from ground 565 and the second voltage rail 563 when LO is one.

In a third scenario in which CTRL0 is one, CTRL1 is zero, and CTRL2 is zero, NMOS transistor 573 is ON when LO is one, NMOS transistor 575 is ON when LO is zero, and PMOS transistor 570 is OFF such that the RF output 580 is coupled to the second voltage rail 563 and decoupled from ground 565 and the first voltage rail 560 when LO is one.

Figure 6:
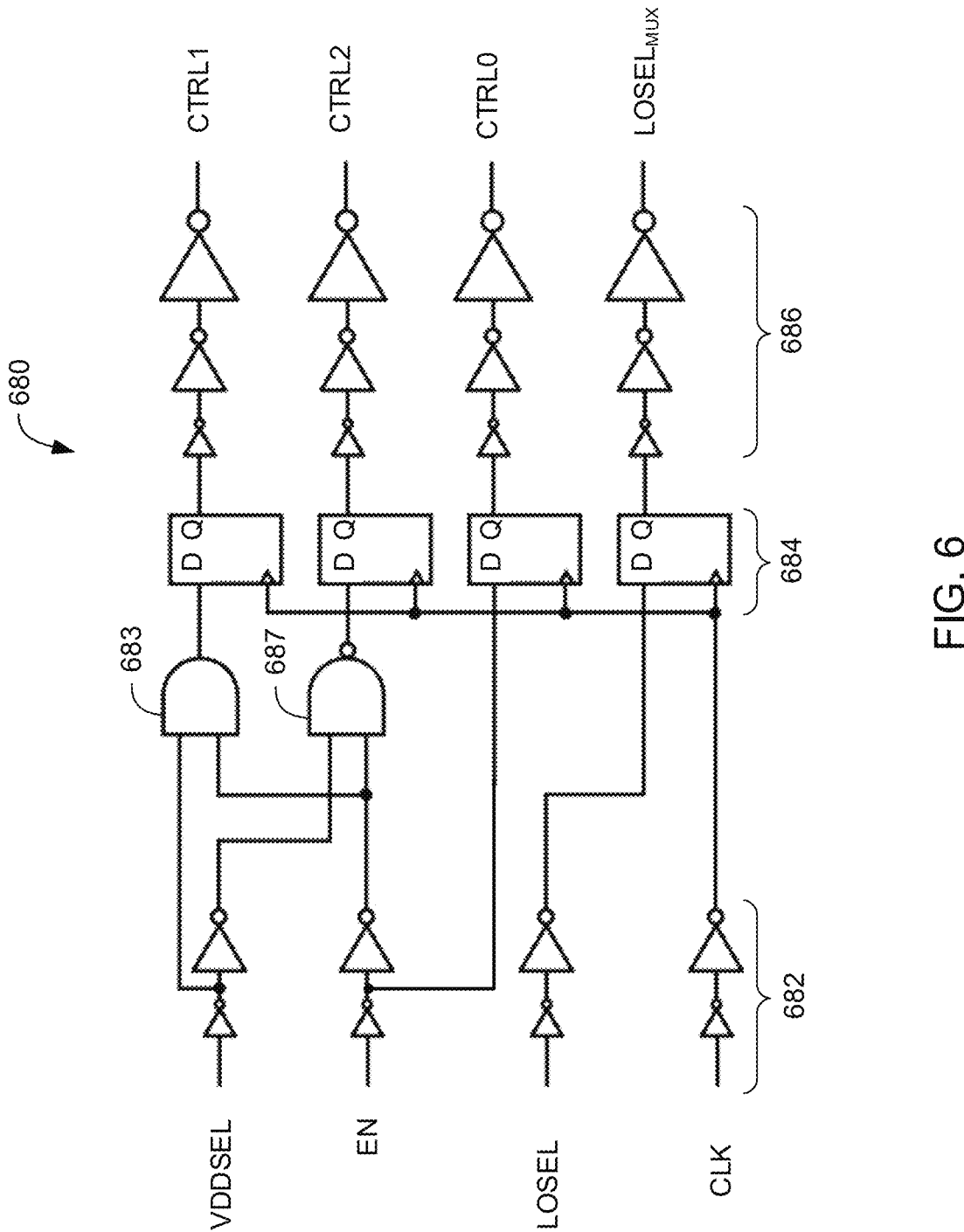
FIG. 6 illustrates an example control circuit for a switch unit.

FIG. 6 illustrates an example control circuit 680 for a switch unit such as control circuit 480 of switch unit 430 of FIG. 4. Example control circuit 680 may receive a clock signal CLK, a local oscillator selection signal LOSEL, an enable signal EN, and a voltage selection signal VDDSEL as input signals. By way of example, the example control circuit 680 generates as output signals control signals CTRL0, CTRL1, CTRL2 for controlling the switch cell 500 of FIG. 5 and control signal $LOSEL_{MUX}$ for controlling the selection of local oscillator phase signal of local oscillator phase signal selector circuit 770 of FIG. 7. Illustratively, the control circuit 680 may generate the control signals CTRL0, CTRL1, CTRL2 such that only one of the first voltage rail 560, the second voltage rail 563, or ground 565 is coupled to the RF output 580 of the switch cell 500 of FIG. 5 at any given time.

As shown in FIG. 6, the example control circuit 680 includes AND gate 683, NAND gate 687, registers 684, input buffers 682 that are implemented using two serially coupled inverters, and output buffers 686 that are implemented using three serially coupled inverters. The input buffers 682 and/or the output buffers 686 may be implemented using more or less than two, respectively three, inverters, if desired. As an example, the output buffers may be implemented using one inverter. As another example, the output buffers may be implemented using five or more serially coupled inverters. In some implementations, the inverters may be replaced by buffers. In other implementations, one or more of the input buffers 682 and/or one or more of the output buffers 686 may be omitted. Illustratively, the input signals may be buffered using input buffers 682, and the output signals may be buffered using output buffers 686.

The registers 684 are clocked by clock signal CLK. Illustratively, a first register of registers 684 receives the local oscillator selection signal LOSEL via a first input buffer of input buffers 682 and provides the signal via a first output buffer of output buffers 686 as control signal LOS- $EL_{MUX}$. By way of example, a second register of registers 684 receives the inverted enable signal EN via a second input buffer of input buffers 682 and provides the signal via a second output buffer of output buffers 686 as control signal CTRL0. As shown in FIG. 6, AND gate 683 receives the enable signal EN via a third buffer of input buffers 682 and the inverted voltage selection signal VDDSEL signal via a fourth buffer of the input buffers 682. Illustratively, a third register of registers 684 receives the output signal of the AND gate and provides the signal via a third output buffer of the output buffers 686 as control signal CTRL 1. By way of example, NAND gate 687 receives the enable signal EN via the third buffer of input buffers 682 and the voltage selection signal VDDSEL signal via the fourth buffer of the input buffers 682. Illustratively, a fourth register of registers 684 receives the output signal of the NAND gate and provides the signal via a fourth output buffer of the output buffers 686 as control signal CTRL 2.

As shown in FIG. 6, when enable signal EN is equal to zero (i.e., EN=0), then control signals CTRL0, CTRL1, CTRL2 are zero, one, zero, respectively (i.e., CTRL0=0, CTRL1=1, CTRL2=0) independent of the voltage selection signal VDDSEL. When enable signal EN is equal to one and the voltage selection signal is equal to zero (i.e., EN=1, VDDSEL=0), then control signals CTRL0, CTRL1, CTRL2 are one, zero, zero, respectively (i.e., CTRL0=1, CTRL1=0, CTRL2=0). When enable signal EN is equal to one and the voltage selection signal is equal to one (i.e., EN=1, VDD-SEL=1), then control signals CTRL0, CTRL1, CTRL2 are one, one, one, respectively (i.e., CTRL0=1, CTRL1=1, CTRL2=1).

FIG. 7 illustrates an example local oscillator phase signal selector circuit 770 for a switch unit such as local oscillator phase signal selector circuit 470 of switch unit 430 of FIG. 4. As shown in FIG. 7, the local oscillator phase signal selector circuit 770 may receive four local oscillator phase signals denoted LO0, LO90, LO180, and LO270. Illustratively, the four local oscillator phase signals may each have a non-overlapping 25% duty cycle. For example, signal LO0 may be active for the first quarter, signal LO90 for the second quarter, signal LO180 for the third quarter, and signal LO270 for the fourth quarter of the cycle.

In some implementations, the local oscillator phase signal selector circuit may receive and select between less than four local oscillator phase signals. For example, the local oscillator phase signal selector circuit may receive and select between two local oscillator phase signals. If desired, the two local oscillator phase signals may have 50% duty cycle. In other implementations, the local oscillator phase signal selector circuit may receive and select between more than four local oscillator phase signals. For example, the local oscillator phase signal selector circuit may receive and select between eight local oscillator phase signals. If desired, the eight local oscillator phase signals may have 12.5% duty cycle.

Illustratively, the local oscillator phase signal selector circuit 770 may receive four control signals for controlling the selection of a corresponding local oscillator phase signal. For example, the local oscillator phase signal selector circuit 770 may receive control signal $LOSEL_{MUX}0$ for controlling the selection of local oscillator phase signal LO0, control signal $LOSEL_{MUX}90$ for controlling the selection of local oscillator phase signal LO90, control signal $LOSEL_{MUX}180$ for controlling the selection of local oscillator phase signal LO180, and control signal $LOSEL_{MUX}270$ for controlling the selection of local oscillator phase signal LO270.

By way of example, the local oscillator phase signal selector circuit 770 may select the four local oscillator phase signals independently of each other using multiplexers 771, 772, 776, and 777. Thus, local oscillator phase signal LO0 may be selected if control signal $LOSEL_{MUX}0$ is high, local oscillator phase signal LO90 may be selected if control signal $LOSEL_{MUX}90$ is high, local oscillator phase signal LO180 may be selected if control signal $LOSEL_{MUX}180$ is high, and local oscillator phase signal LO270 may be selected if control signal $LOSEL_{MUX}270$ is high. If desired, local oscillator phase signal LO0 may be selected if control signal $LOSEL_{MUX}0$ is low, local oscillator phase signal LO90 may be selected if control signal $LOSEL_{MUX}90$ is low, local oscillator phase signal LO180 may be selected if control signal $LOSEL_{MUX}180$ is low, and local oscillator phase signal LO270 may be selected if control signal $LOSEL_{MUX}270$ is low.

As shown in FIG. 7, multiplexers 771, 772, 776, 777 may be implemented using two complementary pass transistors. For example, multiplexer 771 may include an NMOS pass transistor that is controlled by control signal $LOSEL_{MUX}0$ and a PMOS pass transistor that is controlled by the inverse of $LOSEL_{MUX}0$, multiplexer 772 may include an NMOS pass transistor that is controlled by control signal $LOSEL_{MUX}90$ and a PMOS pass transistor that is controlled by the inverse of $LOSEL_{MUX}90$, multiplexer 776 may include an NMOS pass transistor that is controlled by control signal $LOSEL_{MUX}180$ and a PMOS pass transistor that is controlled by the inverse of $LOSEL_{MUX}180$, and multiplexer 777 may include an NMOS pass transistor that is controlled by control signal $LOSEL_{MUX}270$ and a PMOS pass transistor that is controlled by the inverse of $LOSEL_{MUX}270$.

If desired, the local oscillator phase signal selector circuit 770 may include inverters that invert the respective control signal $LOSEL_{MUX}0$, $LOSEL_{MUX}90$, $LOSEL_{MUX}180$, $LOSEL_{MUX}270$ to generate the respective inverse control signal $\overline{LOSEL_{MUX}0}$, $\overline{LOSEL_{MUX}90}$, $\overline{LOSEL_{MUX}180}$, $\overline{LOSEL_{MUX}270}$.

Illustratively, buffers or inverters 773, 774, 778, 779 may buffer the local oscillator phase signals before the multiplexers 771, 772, 776, 777, and another buffer or inverter 775 may buffer the selected local oscillator phase signal LO. Since the four multiplexers 771, 772, 776, 777 can select a respective local oscillator phase signal LO0, LO90, LO180, LO270 independent of the other local oscillator phase signals, and since each local oscillator phase signal has a duty cycle of 25% and is phase shifted by a quarter cycle, only one of the local oscillator phase signals is HIGH at a time. Thus, the selected local oscillator phase signal LO may include a concatenation of the different local oscillator phase signals LO0, LO90, LO180, LO270. For example, multiplexers 771 and 772 may select the two neighboring local oscillator phase signals LO0 and LO90 such that the selected local oscillator phase signal LO has a duty cycle of 50%.

Figures 8A, 8B:
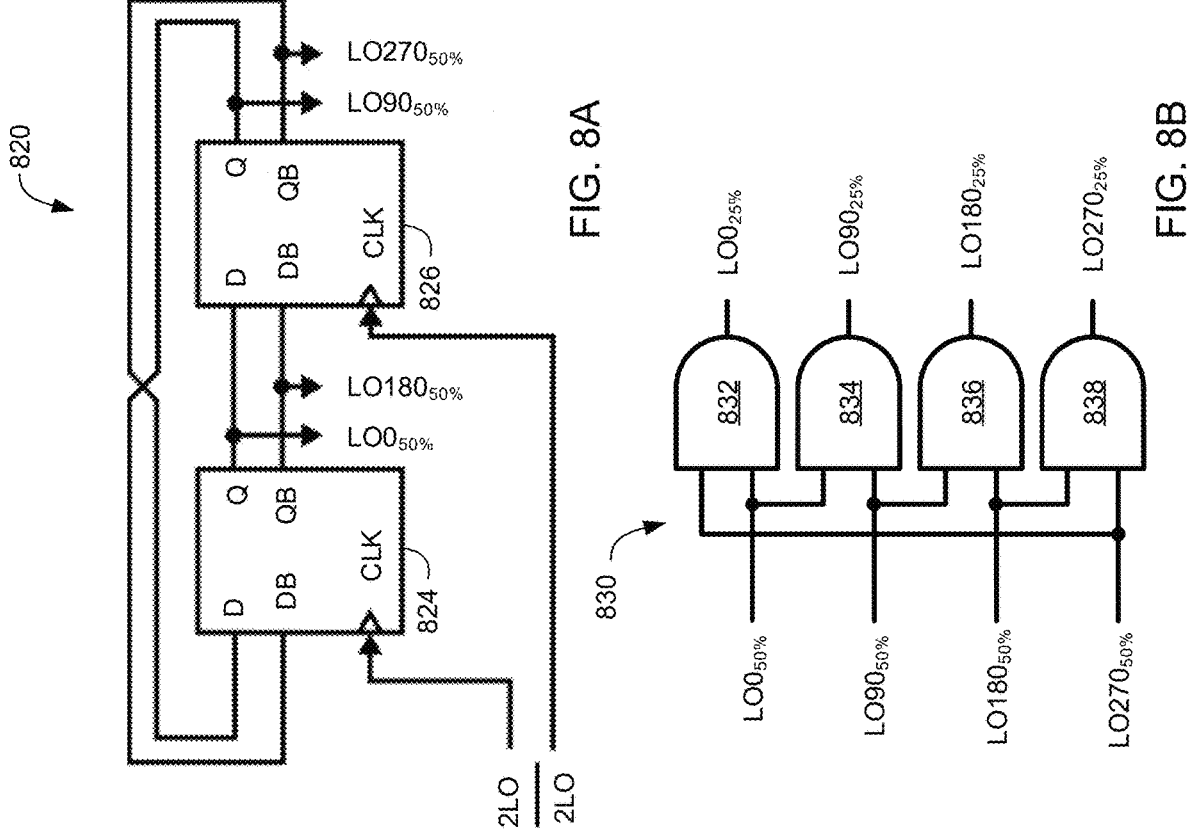
FIG. 8A illustrates an example local oscillator for generating local oscillator phase signals.
FIG. 8B is an illustrative circuit that transforms phase-shifted local oscillator phase signals with a duty cycle of 50% into phase-shifted local oscillator phase signals with a duty cycle of 25%.

FIG. 8A illustrates an example local oscillator 820 for generating local oscillator phase signals. If desired, local oscillator 820 may implement at least a portion of local oscillator 120 of FIG. 1. The local oscillator 820 may receive an LO input signal and generate a plurality of local oscillator phase signals. The local oscillator 820 may include an input balun and a true single-phase clock (TSPC)-based frequency divider designed for low phase noise performance. For differential cartesian direct-conversion, four local oscillator phase signals may be provided, which may include first, second, third, and fourth local oscillator phase signals $LO0_{50\%}$, $LO90_{50\%}$, $LO180_{50\%}$, and $LO270_{50\%}$. If desired, the four local oscillator phase signals may be buffered at the output of the local oscillator 820 to ensure steep edges and avoid phase noise deterioration. In some implementations, the four local oscillator phase signals may feed a clock divider circuit that generates a clock signal with a frequency that is divided by a power of two compared to the input signal frequency.

As shown in FIG. 8A, the local oscillator 820 includes two flip-flops 824 and 826 that generate four local oscillator phase signals. Flip-flop 824 may receive at a clock input a signal that has twice the frequency of the LO input signal. Flip-flop 824 may generate a first local oscillator phase signal $LO0_{50\%}$ at a first output Q and an inverse of the first local oscillator phase signal, which is the third local oscillator phase signal $LO180_{50\%}$ that is 180-degree phase-shifted relative to the first local oscillator phase signal $LO0_{50\%}$, at the second, inverted output QB.

Flip-flop 826 may receive at a clock input a signal that has twice the frequency of the LO input signal, but that is inverted compared to the signal that flip-flop 824 receives at its clock input. Flip-flop 826 may receive the first and third local oscillator phase signals at the data input D and the inverted data input DB, respectively. Thus, flip-flop 826 may generate a second local oscillator phase signal $LO90_{50\%}$ that is 90-degree phase-shifted relative to the first local oscillator phase signal $LO0_{50\%}$ at the first output Q and an inverse of the second local oscillator phase signal, which is the fourth local oscillator phase signal $LO270_{50\%}$ that is 180-degree phase shifted relative to the second local oscillator phase signal $LO90_{50\%}$ and thereby 270-degree phase shifted relative to the first local oscillator phase signal $LO0_{50\%}$, at the second, inverted output QB.

Flip-flop 824 may receive the second and fourth local oscillator phase signals at the inverted data input DB and the data input D, respectively.

Illustratively, the four local oscillator phase signals have the same frequency as the LO input signal, a 50% duty cycle, and are phase-shifted by 90 degrees relative to each other. Thus, the second local oscillator phase signal $LO90_{50\%}$, the third local oscillator phase signal $LO180_{50\%}$, and the fourth local oscillator phase signal $LO270_{50\%}$ of the four local oscillator phase signals are phase-shifted by 90 degrees, 180 degrees, and 270 degrees, respectively, relative to a first local oscillator phase signal $LO0_{50\%}$ of the four local oscillator phase signals.

Since the four local oscillator phase signals have a 50% duty cycle and are phase-shifted by 90 degrees relative to each other, the first, second, third, fourth, and first again overlap with each other for a quarter cycle. For example, the second half of the duty cycle of $LO0_{50\%}$ overlaps with the first half of the duty cycle of $LO90_{50\%}$, the second half of the duty cycle of $LO90_{50\%}$ overlaps with the first half of the duty cycle of $LO180_{50\%}$, the second half of the duty cycle of $LO180_{50\%}$ overlaps with the first half of the duty cycle of $LO270_{50\%}$, the second half of the duty cycle of $LO270_{50\%}$ overlaps with the first half of the duty cycle of $LO0_{50\%}$.

FIG. 8B is an illustrative circuit 830 with four AND gates 832, 834, 836, 838 that transforms the four local oscillator phase signals of FIG. 8A that are shifted by a quarter cycle and have a duty cycle of 50% into four non-overlapping local oscillator phase signals that are shifted by a quarter cycle and have a duty cycle of 25%.

For example, AND gate 834 receives signals $LO0_{50\%}$ and $LO90_{50\%}$ and generates signal $LO90_{25\%}$. Since the second half of the duty cycle of $LO0_{50\%}$ overlaps with the first half of the duty cycle of $LO90_{50\%}$, signal $LO90_{25\%}$ has the same frequency as the LO input signal, a 25% duty cycle and is high for the second quarter of the cycle. AND gate 836 receives signals $LO90_{50\%}$ and $LO180_{50\%}$ and generates signal $LO180_{25\%}$. Since the second half of the duty cycle of $LO90_{50\%}$ overlaps with the first half of the duty cycle of $LO180_{50\%}$, signal $LO180_{25\%}$ has the same frequency as the LO input signal, a 25% duty cycle and is high for the third quarter of the cycle. AND gate 838 receives signals $LO180_{50\%}$ and $LO270_{50\%}$ and generates signal $LO270_{25\%}$. Since the second half of the duty cycle of $LO180_{50\%}$ overlaps with the first half of the duty cycle of $LO270_{50\%}$, signal $LO270_{25\%}$ has the same frequency as the LO input signal, a 25% duty cycle and is high for the fourth quarter of the cycle. AND gate 832 receives signals $LO0_{50\%}$ and $LO270_{50\%}$ and generates signal $LO0_{25\%}$. Since the second half of the duty cycle of $LO270_{50\%}$ overlaps with the first half of the duty cycle of $LO0_{50\%}$, signal $LO0_{25\%}$ has the same frequency as the LO input signal, a 25% duty cycle and is high for the first quarter of the cycle.

Figure 9:
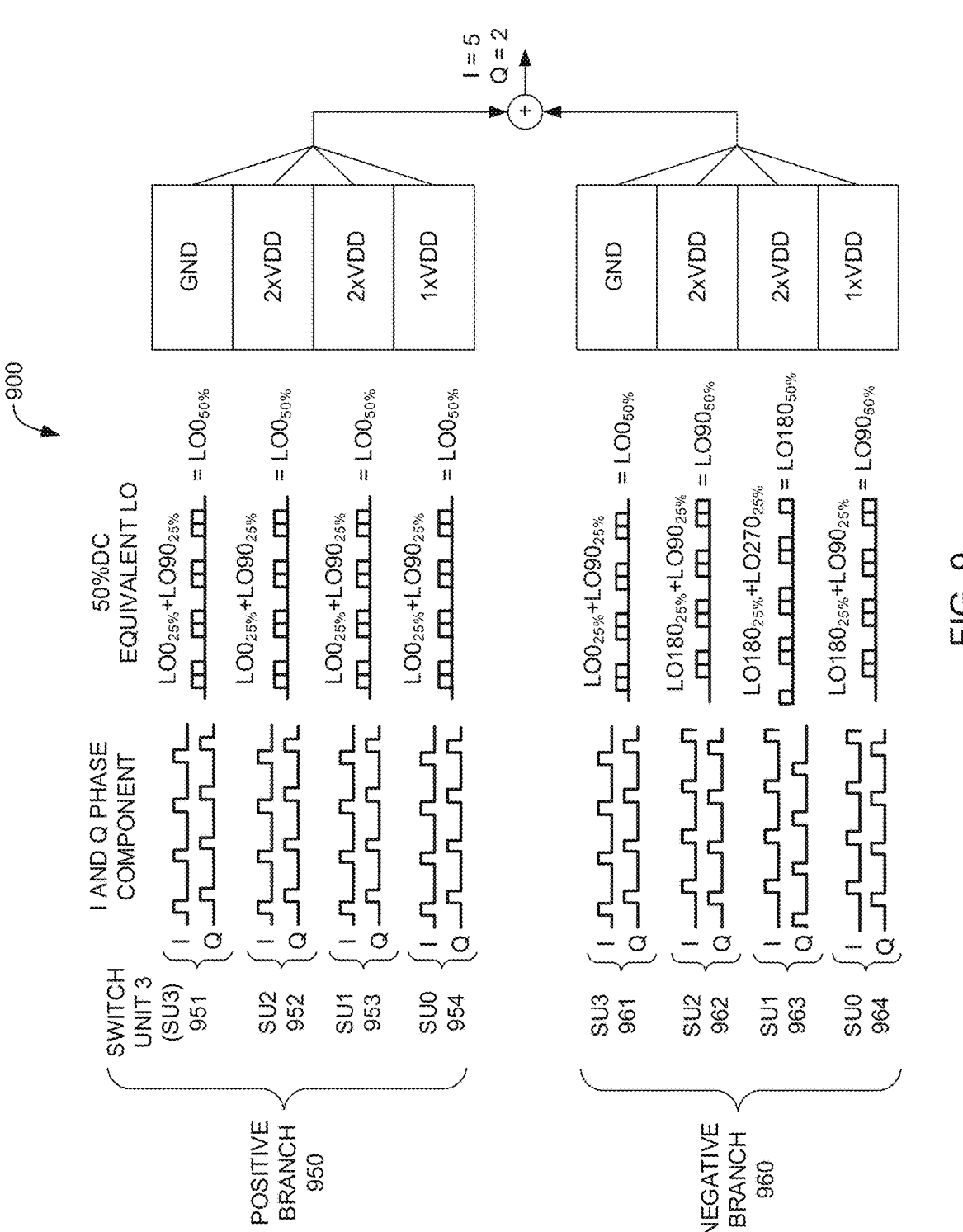
FIG. 9 illustrates an example transmission control operation.

FIG. 9 illustrates an example transmission control operation. For example, control circuit 110 of FIG. 1 as well as control circuit 480 and local oscillator phase signal selector circuit 470 of FIG. 4 may together perform such a transmission control operation to control a RF digital to analog converter circuit such as RF digital to analog converter circuit 330 of FIG. 3. In the present example, the baseband in-phase (I) signal and the baseband quadrature (Q) signal are very different in amplitude. A comparator may compare a first number associated with the baseband in-phase signal (I) with a second number associated with the baseband quadrature signal (Q) to determine a greater number of the baseband in-phase and baseband quadrature signals.

As an example, consider the scenario 900 in which I is equal to "101" (i.e., I=5) and Q is equal to "010" (i.e., Q=2). Consider further that the RF digital to analog converter circuit has a positive branch 950 (e.g., positive branch 350 of FIG. 3) with a first plurality of switch units (e.g., switch unit 3 (SU3) 951, SU2 952, SU1 953, and SU0 954) and a negative branch 960 (e.g., negative branch 360 of FIG. 3) with a second plurality of switch units (e.g., switch unit 3 (SU3) 961, SU2 962, SU1 963, and SU0 964). In this scenario, the baseband in-phase signal is the greater number (I=5) and the baseband quadrature signal the smaller number (Q=2).

Illustratively, the control circuit may be configured to determine whether the greater number of the baseband in-phase and baseband quadrature signals is an even or an odd number and whether the smaller number of the baseband in-phase and baseband quadrature signals is an even or an odd number.

In a first case, in response to determining that the greater number of the baseband in-phase and baseband quadrature signals is an even number and that the smaller number of the baseband in-phase and baseband quadrature signals is an even number, the control circuit may be configured to direct N switch units of the first plurality of switch units and corresponding N switch units of the second plurality of switch units to connect the second voltage to the output port, whereby N is equal to an integer division of the greater number of the baseband in-phase and baseband quadrature signals by two (i.e., N=5/2=2). In the current scenario, the greater number is an odd number and not an even number, and thus this first case does not apply to the current scenario.

In a second case, in response to determining that the greater number of the baseband in-phase and baseband quadrature signals is an even number and that the smaller number of the baseband in-phase and baseband quadrature signals is an odd number, the control circuit may be configured to direct (N−1) switch units of the first plurality of switch units and corresponding (N−1) switch units of the second plurality of switch units to connect the second voltage to the output port, wherein N is equal to an integer division of the greater number of the baseband in-phase and baseband quadrature signals by two. The control circuit may further be configured to direct two other switch units of the first plurality of switch units and corresponding two other switch units of the second plurality of switch units to connect the first voltage to the output port. In the current scenario, the greater number is an odd number and not an even number, and thus this second case does not apply to the current scenario.

In a third case, in response to determining that the greater number of the baseband in-phase and baseband quadrature signals is an odd number, the control circuit may be configured to direct N switch units of the first plurality of switch units and corresponding N switch units of the second plurality of switch units to connect the second voltage to the output port, wherein N is equal to an integer division of the greater number of the baseband in-phase and baseband quadrature signals by two and direct another switch unit of the first plurality of switch units and a corresponding other switch unit of the second plurality of switch units to connect the first voltage to the output port. In the present scenario, the greater number is an odd number (I=5) and N=2. Thus, the control circuit may direct two switch units of the first plurality of switch units (e.g., SU2 952 and SU1 953) and corresponding two switch units of the second plurality of switch units (e.g., SU2 962 and SU1 961) to connect the second voltage (e.g., 2×VDD) to the output port. The control circuit may further direct another switch unit of the first plurality of switch units (e.g., SU0 954) and a corresponding other switch unit of the second plurality of switch units (e.g., SU0 964) to connect the first voltage (e.g., 1×VDD) to the output port.

In other words, the control circuit may direct N switch units (e.g., SU2 952 and SU1 953) of the first plurality of switch units (i.e., of positive branch 950) and N switch units (e.g., SU2 962 and SU1 963) of the second plurality of switch units (i.e., of negative branch 960) to connect only the second voltage (i.e., 2×VDD) to the output port and direct M switch units (e.g., SU0 954) of the first plurality of switch units and corresponding M switch units (e.g., SU0 964) of the second plurality of switch units to connect only the first voltage (i.e., 1×VDD) to the output port, whereby (2N+M) is equal to the greater number of the baseband in-phase and baseband quadrature signals (e.g., N=2, M=1, I=5, Q=2, and 2N+M=I) and (N+M) is smaller than or equal to a number of switch units in the first plurality of switch units.

In all three cases (i.e., in the first, second, and third case), the control circuit may be configured to direct all remaining switch units of the first plurality of switch units (e.g., SU3 951) and all remaining corresponding switch units of the second plurality of switch units (e.g., SU3 961) to connect ground (GND) to the output port.

Illustratively, the control circuit may be configured to direct the switch units to encode the baseband in-phase signal by selecting between the first and third local oscillator phase signals (i.e., by selecting between $LO0_{25\%}$ and $LO180_{25\%}$) and to encode the baseband quadrature signal by selecting between the second and fourth local oscillator phase signals (i.e., by selecting between $LO90_{25\%}$ and $LO270_{25\%}$).

As shown in FIG. 9, each switch unit of the first plurality of switch units (i.e., switch units SU3 951, SU2 952, SU2 953, SU0 954) encodes a positive portion of the baseband in-phase signal (I component) and a corresponding positive portion of the baseband quadrature signal (Q component). By way of example, the control circuit is configured to direct each switch unit of the first plurality of switch units to encode the positive portion of the baseband in-phase signal by selecting the first local oscillator phase signal (i.e., $LO0_{25\%}$) and to encode the corresponding first portion of the baseband quadrature signal by selecting the second local oscillator phase signal (i.e., $LO90_{25\%}$).

Illustratively, the control circuit is configured to direct H switch units of the N switch units of the negative branch 960 and J switch units of the M switch units of the negative branch 960 to encode the negative portion of the baseband in-phase signal by selecting the third local oscillator phase signal and direct switch units other than the H and J switch units to encode the negative portion of the baseband in-phase signal by selecting the first local oscillator phase signal, whereby (2H+J) is equal to the first number associated with the baseband in-phase signal. In the current scenario, the control circuit is configured to direct H=2 switch units of the N=2 switch units of the negative branch 960 (i.e., SU2 962 and SU1 963) and J=1 switch unit (i.e., SU0 964) of the M=1 switch unit of the negative branch 960 to encode the negative portion of the baseband in-phase signal by selecting the third local oscillator phase signal (i.e., $LO180_{25\%}$) and direct switch units other than the H and J switch units (i.e., SU3 961) to encode the negative portion of the baseband in-phase signal by selecting the first local oscillator phase signal (i.e., $LO0_{25\%}$), whereby (2H+J=5) is equal to the first number associated with the baseband in-phase signal (i.e., I=5).

By way of example, the control circuit is configured to direct K switch units of the N switch units of the negative branch 960 and L switch units of the M switch units of the negative branch 960 to encode the negative portion of the baseband quadrature signal by selecting the fourth local oscillator phase signal and direct switch units other than the K and L switch units to encode the negative portion of the baseband quadrature signal by selecting the second local oscillator phase signal, whereby (2K+L) is equal to the second number associated with the baseband quadrature signal. In the present scenario, the control circuit is configured to direct K=1 switch unit (i.e., SU1 963) of the N=2 switch units of the negative branch 960 and L=0 switch units of the M=1 switch unit of the negative branch 960 to encode the negative portion of the baseband quadrature signal by selecting the fourth local oscillator phase signal (i.e., $LO270_{25\%}$) and direct switch units other than the K and L switch units (i.e., SU3 961, SU2 962, SU0 964) to encode the negative portion of the baseband quadrature signal by selecting the second local oscillator phase signal (i.e., $LO90_{25\%}$), whereby (2K+L=2) is equal to the second number associated with the baseband quadrature signal (i.e., Q=2).

As shown in FIG. 9, only local oscillator phase signals with a 50% duty cycle are used. Thus, in some implementations, the circuit 830 of FIG. 8B with four AND gates 832, 834, 836, 838 that transforms the four local oscillator phase signals of FIG. 8A that are shifted by a quarter cycle and have a duty cycle of 50% into four non-overlapping local oscillator phase signals that are shifted by a quarter cycle and have a duty cycle of 25% may be omitted.

FIG. 10 is a flowchart 1000 of an illustrative method of operating a digital to analog signal conversion system such as digital to analog signal conversion system 100 of FIG. 1 with control circuit 110, RF digital to analog converter circuit 130, power combiner circuit 140, and local oscillator 120.

During operation 1010, the digital to analog signal conversion system uses the local oscillator to generate a plurality of local oscillator phase signals. For example, the digital to analog signal conversion system 100 of FIG. 1 uses the local oscillator 120 to generate a plurality of local oscillator phase signals 125.

During operation 1020, the digital to analog signal conversion system receives a baseband in-phase (I) signal and a baseband quadrature (Q) signal at the control circuit. For example, the digital to analog signal conversion system 100 of FIG. 1 receives a baseband in-phase (I) signal 112 and a baseband quadrature (Q) signal 114 at the control circuit 110.

During operation 1030, the digital to analog signal conversion system generates, with the control circuit, a plurality of control signals based on the baseband in-phase signal and the baseband quadrature signal. For example, the digital to analog signal conversion system 100 of FIG. 1 generates, with the control circuit 110, a plurality of control signals 116 based on the baseband in-phase signal 112 and the baseband quadrature signal 114.

During operation 1040, the digital to analog signal conversion system receives the local oscillator phase signals and the plurality of control signals at the RF digital to analog converter circuit. For example, the digital to analog signal conversion system 100 of FIG. 1 receives the local oscillator phase signals 125 and the plurality of control signals 116 at the RF digital to analog converter circuit 130.

During operation 1050, the digital to analog signal conversion system generates a positive radio-frequency signal of the baseband in-phase signal and the baseband quadrature signal in the first plurality of switch units and a negative radio-frequency signal of the baseband in-phase signal and the baseband quadrature signal in the second plurality of switch units by: selecting in first switch units of the first plurality of switch units and corresponding second switch units in the second plurality of switch units one of a first voltage, a second voltage, or ground based on at least a first control signal of the plurality of control signals, selecting, in the first switch units of the first plurality of switch units, two local oscillator phase signals of the local oscillator phase signals based on at least a second control signal of the plurality of control signals, and selecting, in the second switch units of the second plurality of switch units, two local oscillator phase signals of the local oscillator phase signals based on at least a third control signal of the plurality of control signals.

For example, the digital to analog signal conversion system 100 of FIG. 1 generates a positive radio-frequency signal (e.g., RF OUTPUT (+) of FIG. 3) of the baseband in-phase signal 112 and the baseband quadrature signal 114 in the first plurality of switch units 350 of FIG. 3 and a negative radio-frequency signal (e.g., RF OUTPUT (−) of FIG. 3) of the baseband in-phase signal 112 and the baseband quadrature signal 114 in the second plurality of switch units 360 by: selecting in first switch units of the first plurality of switch units 350 and corresponding second switch units in the second plurality of switch units 360 one of a first voltage (e.g., first voltage 460 of FIG. 4 or voltage 1×VDD of FIG. 9), a second voltage (e.g., second voltage 463 of FIG. 4 or voltage 2×VDD of FIG. 9), or ground (e.g., ground 465 of FIG. 4 or GND of FIG. 9) based on at least a first control signal of the plurality of control signals (e.g., EN or VDDSEL of FIG. 6 that generate CTRL0, CTRL1, CTRL2 of FIG. 4, FIG. 5, or FIG. 6), selecting, in the first switch units (e.g., switch unit SU1 953 of FIG. 9) of the first plurality of switch units (e.g., the switch units in the positive branch of FIG. 9), two local oscillator phase signals (e.g., LO0$_{25\%}$ and LO90$_{25\%}$ of FIG. 8B or FIG. 9) of the local oscillator phase signals based on at least a second control signal (e.g., LOSEL of FIG. 4 or FIG. 6) of the plurality of control signals, and selecting, in the second switch units (e.g., switch unit SU1 963 of FIG. 9) of the second plurality of switch units (e.g., the switch units in the negative branch 960 of FIG. 9), two local oscillator phase signals of the local oscillator phase signals (e.g., LO180$_{25\%}$ and LO270$_{25\%}$ of FIG. 8B or FIG. 9) based on at least a third control signal (e.g., LOSEL of FIG. 4 or FIG. 6) of the plurality of control signals.

During operation 1060, the digital to analog signal conversion system generates, with the power combiner circuit, a radio-frequency output signal based on a combination of the positive radio-frequency signal from the first plurality of switch units and the negative radio-frequency signal from the second plurality of switch units. For example, the digital to analog signal conversion system 100 of FIG. 1 generates, with the power combiner circuit 240 of FIG. 2, a radio-frequency output signal 270 based on a combination of the positive radio-frequency signal from the first plurality of switch units 250 and the negative radio-frequency signal from the second plurality of switch units 260.

Illustratively, the digital to analog signal conversion system may compare a first number associated with the baseband in-phase signal with a second number associated with the baseband quadrature signal to determine a greater number of the baseband in-phase and baseband quadrature signals and a smaller number of the baseband in-phase and baseband quadrature signals. For example, in the scenario of FIG. 9, the digital to analog signal conversion system may compare I=5 with Q=2 to determine that I=5 is the greater number and Q=2 the smaller number of I and Q.

By way of example, the digital to analog signal conversion system may determine whether the greater number of the baseband in-phase and baseband quadrature signals is an even or an odd number and whether the smaller number of the baseband in-phase and baseband quadrature signals is an even or an odd number. In response to determining that the greater number of the baseband in-phase and baseband quadrature signals is an odd number, the digital to analog signal conversion system may select the second voltage in N of the first switch units of the first plurality of switch units and corresponding N of the second switch units of the second plurality of switch units, whereby N is equal to an integer division of the greater number of the baseband in-phase and baseband quadrature signals by two; and select the first voltage in another one of the first switch units of the first plurality of switch units and a corresponding other one of the second switch units of the second plurality of switch units. In the scenario of FIG. 9, N=2 and the digital to analog signal conversion system selects 2×VDD in switch units SU2 952, SU1 953, SU2 962 and SU1 963 and select 1×VDD in switch units SU0 954 and SU0964.

In response to determining that the greater number of the baseband in-phase and baseband quadrature signals is an even number and that the smaller number of the baseband in-phase and baseband quadrature signals is an even number, the digital to analog signal conversion system may select the second voltage in N of the first switch units of the first plurality of switch units and corresponding N of the second switch units of the second plurality of switch units, wherein N is equal to an integer division of the greater number of the baseband in-phase and baseband quadrature signals by two.

In response to determining that the greater number of the baseband in-phase and baseband quadrature signals is an even number and that the smaller number of the baseband in-phase and baseband quadrature signals is an odd number, the digital to analog signal conversion system may select the second voltage in (N−1) of the first switch units of the first plurality of switch units and corresponding (N−1) of the second switch units of the second plurality of switch units, whereby N is equal to an integer division of the greater number of the baseband in-phase and baseband quadrature signals by two; and select the first voltage in two other ones of the first switch units of the first plurality of switch units and corresponding two other ones of the second switch units of the second plurality of switch units.

Illustratively, the digital to analog signal conversion system may select ground in all remaining ones of the first switch units of the first plurality of switch units and all corresponding remaining ones of the second switch units of the second plurality of switch units. In the scenario of FIG. 9, the digital to analog signal conversion system may select GND in switch units SU3 951 and SU3 961.

If desired, the digital to analog signal conversion system may use the local oscillator to generate the plurality of local oscillator phase signals as four local oscillator signals that have a 25% duty cycle each and that are phase-shifted by 90 degrees relative to each other. For example, the local oscillator shown in FIG. 8A together with the logic circuit of FIG. 8B may generate the four local oscillator signals LO0$_{25\%}$, LO90$_{25\%}$, LO180$_{25\%}$, and LO270$_{25\%}$ that have a 25% duty cycle each and are phase-shifted by 90 degrees relative to each other.

With the power combiner circuit, the digital to analog signal conversion system may generate the radio-frequency output signal by implementing a sum of a first portion of the positive radio-frequency signal and a corresponding first portion of the negative radio-frequency signal when selected local oscillator phase signals have an anti-phase relationship with each other, and by implementing a difference of a second portion of the positive radio-frequency signal and a corresponding second portion of the negative radio-frequency signal when the selected local oscillator phase signals have an in-phase relationship with each other. In the scenario of FIG. 9, the digital to analog signal conversion system may generate the signal I by combining the component I of switch units SU2 952, SU1 953, and SU0 954 with the component I of respective switch units SU2 962, SU1 963, and SU0 964. Since the corresponding local oscillator phase signals LO0$_{25\%}$ and LO180$_{25\%}$ have an anti-phase relationship with each other, the respective I components are summed up or concatenated, whereby the respective switch units SU2 and SU1 contribute two (i.e., 2×VDD) each and switch unit SU0 contributes one (i.e., 1×VDD) for a total of I=2+2+1=5. Similarly, the digital to analog signal conversion system may generate the signal Q by combining the component Q of switch units SU2 952, SU1 953, and SU0 954 with the component Q of respective switch units SU2 962, SU1 963, and SU0 964. Since in SU1, the corresponding local oscillator phase signals LO90$_{25\%}$ and LO270$_{25\%}$ have an anti-phase relationship with each other, the respective Q components are summed up or concatenated, whereas in SU2 and SU0, the corresponding local oscillator phase signals LO90$_{25\%}$ have an in-phase relationship with each other and the respective Q components cancel each other.

Thus, the respective switch unit SU1 contributes two (i.e., 2×VDD) and switch units SU2 and SU0 contributes zero for a total of Q=0+2+0=2.

By way of example, for generating the plurality of control signals based on the baseband in-phase signal and the baseband quadrature signal, the digital to analog signal conversion system may, with the control circuit generate first control signals that direct first and second switch units to encode the baseband in-phase signal by selecting between two local oscillator signals of the four local oscillator signals that are phase-shifted by 180 degrees relative to each other and to encode the baseband quadrature signal by selecting between two other local oscillator signals of the four local oscillator signals that are phase-shifted by 180 degrees relative to each other and by 90 degrees relative to the two local oscillator signals.

Although the description has been described with respect to particular embodiments thereof, these particular embodiments are merely illustrative, and not restrictive. For example, the logic between input signals VDDSEL and EN of FIG. 6 and the voltage selection of FIG. 5 may be implemented differently, if desired, as long as any two of the first voltage, the second voltage, and ground are not connected to the RF output at the same time.

Particular embodiments may be implemented by using a programmed general-purpose digital computer, application-specific integrated circuits, programmable logic devices, field-programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Example 1 is a digital to analog signal conversion system comprising: a local oscillator that generates a plurality of local oscillator phase signals; a control circuit that receives a baseband in-phase (I) signal and a baseband quadrature (Q) signal and generates a plurality of control signals based on the baseband in-phase signal and the baseband quadrature signal; a RF digital to analog converter circuit that receives the local oscillator phase signals and the plurality of control signals and comprises: a first plurality of switch units that generates a positive radio-frequency signal based on the plurality of local oscillator phase signals and the plurality of control signals, and a second plurality of switch units that generates a negative radio-frequency signal based on the plurality of local oscillator phase signals and the plurality of control signals, wherein at least one switch unit of the first or second pluralities of switch units comprises an output port and provides at least a portion of the positive radio-frequency output signal or at least a portion of the negative radio-frequency output signal at the output port, wherein the control circuit is configured to direct the at least one switch unit to encode the baseband in-phase signal and the baseband quadrature signal by selecting a local oscillator phase signal of the local oscillator phase signals based on at least a first control signal of the plurality of control signals and by selecting one of a first voltage, a second voltage, or ground based on at least a second control signal of the plurality of control signals; and a power combiner circuit that generates a radio-frequency output signal based on a combination of the positive radio-frequency signal from the first plurality of switch units and the negative radio-frequency signal from the second plurality of switch units.

In Example 2, the power combiner circuit of Example 1 is configured to implement a sum of a first portion of the positive radio-frequency signal and a corresponding first portion of the negative radio-frequency signal when selected local oscillator phase signals have an anti-phase relationship with each other and to implement a difference of a second portion of the positive radio-frequency signal and a corresponding second portion of the negative radio-frequency signal when the selected local oscillator phase signals have an in-phase relationship with each other.

In Example 3, the first voltage of Example 1 is a power of two of the second voltage.

In Example 4, the at least one switch unit of Example 3 further comprises: a selection circuit that receives the at least a second control signal and connects only one of the first voltage, the second voltage, or ground to the output port.

In Example 5, the control circuit of Example 4 further comprises: a comparator that compares a first number associated with the in-phase signal with a second number associated with the baseband quadrature signal to determine a greater number of the baseband in-phase and baseband quadrature signals and a smaller number of the baseband in-phase and baseband quadrature signals; and wherein the control circuit is further configured to: determine whether the greater number of the baseband in-phase and baseband quadrature signals is an even or an odd number and whether the smaller number of the baseband in-phase and baseband quadrature signals is an even or an odd number, in response to determining that the greater number of the baseband in-phase and baseband quadrature signals is an odd number: direct N switch units of the first plurality of switch units and corresponding N switch units of the second plurality of switch units to connect the second voltage to the output port, wherein N is equal to an integer division of the greater number of the baseband in-phase and baseband quadrature signals by two; and direct another switch unit of the first plurality of switch units and a corresponding other switch unit of the second plurality of switch units to connect the first voltage to the output port; in response to determining that the greater number of the baseband in-phase and baseband quadrature signals is an even number and that the smaller number of the baseband in-phase and baseband quadrature signals is an even number: direct N switch units of the first plurality of switch units and corresponding N switch units of the second plurality of switch units to connect the second voltage to the output port, wherein N is equal to an integer division of the greater number of the baseband in-phase and baseband quadrature signals by two; in response to determining that the greater number of the baseband in-phase and baseband quadrature signals is an even number and that the smaller number of the baseband in-phase and baseband quadrature signals is an odd number: direct (N−1) switch units of the first plurality of switch units and corresponding (N−1) switch units of the second plurality of switch units to connect the second voltage to the output port, wherein N is equal to an integer division of the greater number of the baseband in-phase and baseband quadrature signals by two; and direct two other switch units of the first plurality of switch units and corresponding two other switch units of the second plurality of switch units to connect the first voltage to the output port; and direct all remaining switch units of the first plurality of switch units and all remaining corresponding switch units of the second plurality of switch units to connect ground to the output port.

In Example 6, the local oscillator of Example 1 generates the plurality of local oscillator phase signals as four local oscillator phase signals, each one of the four local oscillator phase signals having a 25% duty cycle.

In Example 7, a second, third, and fourth local oscillator phase signal of the four local oscillator phase signals of Example 6 are phase-shifted by 90 degrees, 180 degrees, and 270 degrees, respectively, relative to a first local oscillator phase signal of the four local oscillator phase signals.

In Example 8, the control circuit of Example 7 is further configured to direct the at least one switch unit to encode the baseband in-phase signal by selecting between the first and third local oscillator phase signals and to encode the baseband quadrature signal by selecting between the second and fourth local oscillator phase signals.

In Example 9, each switch unit of the first plurality of switch units of Example 7 encodes a positive portion of the baseband in-phase signal and a corresponding positive portion of the baseband quadrature signal, and wherein the control circuit is configured to direct each switch unit of the first plurality of switch units to encode the positive portion of the baseband in-phase signal by selecting the first local oscillator phase signal and to encode the corresponding first portion of the baseband quadrature signal by selecting the second local oscillator phase signal.

In Example 10, the control circuit of Example 9 further comprises: a comparator that compares a first number associated with the baseband in-phase signal with a second number associated with the baseband quadrature signal to determine a greater number of the baseband in-phase and baseband quadrature signals; and wherein the control circuit is further configured to: direct N switch units of the first plurality of switch units and corresponding N switch units of the second plurality of switch units to connect only the second voltage to the output port, direct M switch units of the first plurality of switch units and corresponding M switch units of the second plurality of switch units to connect only the first voltage to the output port, wherein (2N+M) is equal to the greater number of the baseband in-phase and baseband quadrature signals and (N+M) is smaller than or equal to a number of switch units in the first plurality of switch units, direct remaining switch units of the first plurality of switch units and corresponding remaining switch units of the second plurality of switch units to connect only ground to the output port, direct I switch units of the N switch units of the second plurality of switch units and J switch units of the M switch units of the second plurality of switch units to encode the negative portion of the baseband in-phase signal by selecting the third local oscillator phase signal and direct switch units other than the I and J switch units to encode the negative portion of the baseband in-phase signal by selecting the first local oscillator phase signal, wherein (2I+J) is equal to the first number associated with the baseband in-phase signal, and direct K switch units of the N switch units of the second plurality of switch units and L switch units of the M switch units of the second plurality of switch units to encode the negative portion of the baseband quadrature signal by selecting the fourth local oscillator phase signal and direct switch units other than the K and L switch units to encode the negative portion of the baseband quadrature signal by selecting the second local oscillator phase signal, wherein (2K+L) is equal to the second number associated with the baseband quadrature signal.

Example 11 is a control circuit for a digital to analog signal conversion system having a local oscillator that generates four local oscillator phase signals that have a 25% duty cycle each and that are phase-shifted by 90 degrees relative to each other, a RF digital to analog converter circuit with a first plurality of switch units that generates a positive radio-frequency signal and a second plurality of switch units that generates a negative radio-frequency signal, and a power combiner circuit that generates a radio-frequency output signal based on a combination of the positive radio-frequency signal and the negative radio-frequency signal, comprising: a first input port that receives a baseband in-phase signal; a second input port that receives a baseband quadrature signal; a local oscillator phase signal selector circuit that is configured to generate first control signals that select for each switch unit of the first and second pluralities of switch units one of the four oscillator signals for encoding the baseband in-phase signal and another one of the four oscillator signals for encoding the baseband quadrature signal; and a voltage selector circuit that is configured to generate second control signals that select for each switch unit of the first and second pluralities of switch units to connect a single one of a first voltage, a second voltage, or ground to an output port of the respective switch unit based on the baseband in-phase signal and the baseband quadrature signal, wherein the second voltage is twice the first voltage.

In Example 12, the control circuit of Example 11 further comprises a comparator that compares a first number associated with the baseband in-phase signal with a second number associated with the baseband quadrature signal to determine a greater number of the baseband in-phase and baseband quadrature signals and a smaller number of the baseband in-phase and baseband quadrature signals.

In Example 13, the voltage selector circuit of Example 12 is further configured to: determine whether the greater number of the baseband in-phase and baseband quadrature signals is an even or an odd number and whether the smaller number of the baseband in-phase and baseband quadrature signals is an even or an odd number; in response to determining that the greater number of the baseband in-phase and baseband quadrature signals is an odd number: generate N control signals of the second control signals to direct N switch units of the first plurality of switch units and corresponding N switch units of the second plurality of switch units to connect the second voltage to the output port, wherein N is equal to an integer division of the greater number of the baseband in-phase and baseband quadrature signals by two; and generate another control signal of the second control signals to direct another switch unit of the first plurality of switch units and a corresponding other switch unit of the second plurality of switch units to connect the first voltage to the output port; in response to determining that the greater number of the baseband in-phase and baseband quadrature signals is an even number and that the smaller number of the baseband in-phase and baseband quadrature signals is an even number: generate N control signals of the second control signals to direct N switch units of the first plurality of switch units and corresponding N switch units of the second plurality of switch units to connect the second voltage to the output port, wherein N is equal to an integer division of the greater number of the baseband in-phase and baseband quadrature signals by two; in response to determining that the greater number of the baseband in-phase and baseband quadrature signals is an even number and that the smaller number of the baseband in-phase and baseband quadrature signals is an odd number: generate (N−1) control signals of the second control signals to direct (N−1) switch units of the first plurality of switch units and corresponding (N−1) switch units of the second plurality of switch units to connect the second voltage to the output port, wherein N is equal to an integer division of the greater number of the baseband in-phase and baseband quadrature signals by two; and generate two other control signals of the second control signals to direct two other switch units of the first plurality of switch units and corresponding two other switch units of the second plurality of switch units to connect the first voltage to the output port; and generate all remaining control signals of the second control signals to direct all remaining switch units of the first plurality of switch units and all remaining corresponding switch units of the second plurality of switch units to connect ground to the output port.

In Example 14, the local oscillator phase signal selector circuit of Example 11 is configured to generate first control signals such that the first control signals direct each switch unit of the first and second pluralities of switch units to encode the baseband in-phase signal by selecting between two local oscillator phase signals of the four local oscillator phase signals that are phase-shifted by 180 degrees relative to each other and to encode the baseband quadrature signal by selecting between two other local oscillator phase signals of the four local oscillator phase signals that are phase-shifted by 180 degrees relative to each other and by 90 degrees relative to the two local oscillator phase signals.

In Example 15, the local oscillator phase signal selector circuit of Example 14 is configured to further generate first control signals such that the first control signals direct a switch unit of the first plurality of switch units and a corresponding switch unit of the second plurality of switch units to select a same local oscillator phase signal of the four local oscillator phase signals to cancel contribution of the switch unit and the corresponding switch unit to the radio-frequency output of the baseband in-phase signal and/or the baseband quadrature signal.

Example 16 is a method of operating a digital to analog signal conversion system having a local oscillator, a control circuit, a RF digital to analog converter circuit with first and second pluralities of switch units, and a power combiner circuit, comprising: using the local oscillator to generate a plurality of local oscillator phase signals; receiving a baseband in-phase (I) signal and a baseband quadrature (Q) signal at the control circuit; generating, with the control circuit, a plurality of control signals based on the baseband in-phase signal and the baseband quadrature signal; receiving the local oscillator phase signals and the plurality of control signals at the RF digital to analog converter circuit; generating a positive radio-frequency signal of the baseband in-phase signal and the baseband quadrature signal in the first plurality of switch units and a negative radio-frequency signal of the baseband in-phase signal and the baseband quadrature signal in the second plurality of switch units by: selecting in first switch units of the first plurality of switch units and corresponding second switch units in the second plurality of switch units one of a first voltage, a second voltage, or ground based on at least a first control signal of the plurality of control signals, selecting, in the first switch units of the first plurality of switch units, two local oscillator phase signals of the local oscillator phase signals based on at least a second control signal of the plurality of control signals, and selecting, in the second switch units of the second plurality of switch units, two local oscillator phase signals of the local oscillator phase signals based on at least a third control signal of the plurality of control signals; and generating, with the power combiner circuit, a radio-frequency output signal based on a combination of the positive radio-frequency signal from the first plurality of switch units and the negative radio-frequency signal from the second plurality of switch units.

In Example 17, the method of Example 16 further comprises: comparing a first number associated with the baseband in-phase signal with a second number associated with the baseband quadrature signal to determine a greater number of the baseband in-phase and baseband quadrature signals and a smaller number of the baseband in-phase and baseband quadrature signals.

In Example 18, the method of Example 17, further comprises: determining whether the greater number of the baseband in-phase and baseband quadrature signals is an even or an odd number and whether the smaller number of the baseband in-phase and baseband quadrature signals is an even or an odd number, in response to determining that the greater number of the baseband in-phase and baseband quadrature signals is an odd number: selecting the second voltage in N of the first switch units of the first plurality of switch units and corresponding N of the second switch units of the second plurality of switch units, wherein N is equal to an integer division of the greater number of the baseband in-phase and baseband quadrature signals by two; and selecting the first voltage in another one of the first switch units of the first plurality of switch units and a corresponding other one of the second switch units of the second plurality of switch units; in response to determining that the greater number of the baseband in-phase and baseband quadrature signals is an even number and that the smaller number of the baseband in-phase and baseband quadrature signals is an even number: selecting the second voltage in N of the first switch units of the first plurality of switch units and corresponding N of the second switch units of the second plurality of switch units, wherein N is equal to an integer division of the greater number of the baseband in-phase and baseband quadrature signals by two; in response to determining that the greater number of the baseband in-phase and baseband quadrature signals is an even number and that the smaller number of the baseband in-phase and baseband quadrature signals is an odd number: selecting the second voltage in (N−1) of the first switch units of the first plurality of switch units and corresponding (N−1) of the second switch units of the second plurality of switch units, wherein N is equal to an integer division of the greater number of the baseband in-phase and baseband quadrature signals by two; and selecting the first voltage in two other ones of the first switch units of the first plurality of switch units and corresponding two other ones of the second switch units of the second plurality of switch units; and selecting ground in all remaining ones of the first switch units of the first plurality of switch units and all corresponding remaining ones of the second switch units of the second plurality of switch units.

In Example 19, the method of Example 16, further comprises: using the local oscillator to generate the plurality of local oscillator phase signals as four local oscillator phase signals that have a 25% duty cycle each and that are phase-shifted by 90 degrees relative to each other; and generating, with the power combiner circuit, the radio-frequency output signal by: implementing a sum of a first portion of the positive radio-frequency signal and a corresponding first portion of the negative radio-frequency signal when selected local oscillator phase signals have an anti-phase relationship with each other, and implementing a difference of a second portion of the positive radio-frequency signal and a corresponding second portion of the negative radio-frequency signal when the selected local oscillator phase signals have an in-phase relationship with each other.

In Example 20, generating, with the control circuit, the plurality of control signals based on the baseband in-phase signal and the baseband quadrature signal of Example 19 further comprises: generating first control signals that direct first and second switch units to encode the baseband in-phase signal by selecting between two local oscillator phase signals of the four local oscillator phase signals that are phase-shifted by 180 degrees relative to each other and to encode the baseband quadrature signal by selecting between two other local oscillator phase signals of the four local oscillator phase signals that are phase-shifted by 180 degrees relative to each other and by 90 degrees relative to the two local oscillator

We claim:

1. A digital to analog signal conversion system comprising:

a local oscillator that generates a plurality of local oscillator phase signals;

a control circuit that receives a baseband in-phase (I) signal and a baseband quadrature (Q) signal and generates a plurality of control signals based on the baseband in-phase signal and the baseband quadrature signal;

a radio-frequency digital to analog converter circuit that receives the local oscillator phase signals and the plurality of control signals and comprises:

a first plurality of switch units that generates a positive radio-frequency signal based on the plurality of local oscillator phase signals and the plurality of control signals, and a second plurality of switch units that generates a negative radio-frequency signal based on the plurality of local oscillator phase signals and the plurality of control signals, wherein at least one switch unit of the first or second pluralities of switch units comprises an output port and provides at least a portion of the positive radio-frequency output signal or at least a portion of the negative radio-frequency output signal at the output port, wherein the control circuit is configured to direct the at least one switch unit to encode the baseband in-phase signal and the baseband quadrature signal by selecting a local oscillator phase signal of the local oscillator phase signals based on at least a first control signal of the plurality of control signals and by selecting one of a first voltage, a second voltage, or ground based on at least a second control signal of the plurality of control signals; and a power combiner circuit that generates a radio-frequency output signal based on a combination of the positive radio-frequency signal from the first plurality of switch units and the negative radio-frequency signal from the second plurality of switch units.

2. The digital to analog signal conversion system of claim 1, wherein the power combiner circuit is configured to implement a sum of a first portion of the positive radio-frequency signal and a corresponding first portion of the negative radio-frequency signal when selected local oscillator phase signals have an anti-phase relationship with each other and to implement a difference of a second portion of the positive radio-frequency signal and a corresponding second portion of the negative radio-frequency signal when the selected local oscillator phase signals have an in-phase relationship with each other.

3. The digital to analog signal conversion system of claim 1, wherein the first voltage is a power of two of the second voltage.

4. The digital to analog signal conversion system of claim 3, wherein the at least one switch unit further comprises:

a selection circuit that receives the at least a second control signal and connects only one of the first voltage, the second voltage, or ground to the output port.

5. The digital to analog signal conversion system of claim 4, wherein the control circuit further comprises:

a comparator that compares a first number associated with the in-phase signal with a second number associated with the baseband quadrature signal to determine a greater number of the baseband in-phase and baseband quadrature signals and a smaller number of the baseband in-phase and baseband quadrature signals; and wherein the control circuit is further configured to:

determine whether the greater number of the baseband in-phase and baseband quadrature signals is an even or an odd number and whether the smaller number of the baseband in-phase and baseband quadrature signals is an even or an odd number, in response to determining that the greater number of the baseband in-phase and baseband quadrature signals is an odd number:

direct N switch units of the first plurality of switch units and corresponding N switch units of the second plurality of switch units to connect the second voltage to the output port, wherein N is equal to an integer division of the greater number of the baseband in-phase and baseband quadrature signals by two; and direct another switch unit of the first plurality of switch units and a corresponding other switch unit of the second plurality of switch units to connect the first voltage to the output port;

in response to determining that the greater number of the baseband in-phase and baseband quadrature signals is an even number and that the smaller number of the baseband in-phase and baseband quadrature signals is an even number:

direct N switch units of the first plurality of switch units and corresponding N switch units of the second plurality of switch units to connect the second voltage to the output port, wherein N is equal to an integer division of the greater number of the baseband in-phase and baseband quadrature signals by two;

in response to determining that the greater number of the baseband in-phase and baseband quadrature signals is an even number and that the smaller number of the baseband in-phase and baseband quadrature signals is an odd number:

direct (N−1) switch units of the first plurality of switch units and corresponding (N−1) switch units of the second plurality of switch units to connect the second voltage to the output port, wherein N is equal to an integer division of the greater number of the baseband in-phase and baseband quadrature signals by two; and direct two other switch units of the first plurality of switch units and corresponding two other switch units of the second plurality of switch units to connect the first voltage to the output port; and direct all remaining switch units of the first plurality of switch units and all remaining corresponding switch units of the second plurality of switch units to connect ground to the output port.

6. The digital to analog signal conversion system of claim 1, wherein the local oscillator generates the plurality of local oscillator phase signals as four local oscillator phase signals, each one of the four local oscillator phase signals having a 25% duty cycle.

7. The digital to analog signal conversion system of claim 6, wherein a second, third, and fourth local oscillator phase signal of the four local oscillator phase signals are phase-shifted by 90 degrees, 180 degrees, and 270 degrees, respectively, relative to a first local oscillator phase signal of the four local oscillator phase signals.

8. The digital to analog signal conversion system of claim 7, wherein the control circuit is further configured to direct the at least one switch unit to encode the baseband in-phase signal by selecting between the first and third local oscillator phase signals and to encode the baseband quadrature signal by selecting between the second and fourth local oscillator phase signals.

9. The digital to analog signal conversion system of claim 7, wherein each switch unit of the first plurality of switch units encodes a positive portion of the baseband in-phase signal and a corresponding positive portion of the baseband quadrature signal, and wherein the control circuit is configured to direct each switch unit of the first plurality of switch units to encode the positive portion of the baseband in-phase signal by selecting the first local oscillator phase signal and to encode the corresponding first portion of the baseband quadrature signal by selecting the second local oscillator phase signal.

10. The digital to analog signal conversion system of claim 9, wherein the control circuit further comprises:

a comparator that compares a first number associated with the baseband in-phase signal with a second number associated with the baseband quadrature signal to determine a greater number of the baseband in-phase and baseband quadrature signals; and wherein the control circuit is further configured to:

direct N switch units of the first plurality of switch units and corresponding N switch units of the second plurality of switch units to connect only the second voltage to the output port, direct M switch units of the first plurality of switch units and corresponding M switch units of the second plurality of switch units to connect only the first voltage to the output port, wherein (2N+M) is equal to the greater number of the baseband in-phase and baseband quadrature signals and (N+M) is smaller than or equal to a number of switch units in the first plurality of switch units, direct remaining switch units of the first plurality of switch units and corresponding remaining switch units of the second plurality of switch units to connect only ground to the output port, direct I switch units of the N switch units of the second plurality of switch units and J switch units of the M switch units of the second plurality of switch units to encode the negative portion of the baseband in-phase signal by selecting the third local oscillator phase signal and direct switch units other than the I and J switch units to encode the negative portion of the baseband in-phase signal by selecting the first local oscillator phase signal, wherein (2I+J) is equal to the first number associated with the baseband in-phase signal, and direct K switch units of the N switch units of the second plurality of switch units and L switch units of the M switch units of the second plurality of switch units to encode the negative portion of the baseband quadrature signal by selecting the fourth local oscillator phase signal and direct switch units other than the K and L switch units to encode the negative portion of the baseband quadrature signal by selecting the second local oscillator phase signal, wherein (2K+L) is equal to the second number associated with the baseband quadrature signal.

11. A control circuit for a digital to analog signal conversion system having a local oscillator that generates four local oscillator phase signals that have a 25% duty cycle each and that are phase-shifted by 90 degrees relative to each other, a radio-frequency digital to analog converter circuit with a first plurality of switch units that generates a positive radio-frequency signal and a second plurality of switch units that generates a negative radio-frequency signal, and a power combiner circuit that generates a radio-frequency output signal based on a combination of the positive radio-frequency signal and the negative radio-frequency signal, comprising:

a first input port that receives a baseband in-phase signal;

a second input port that receives a baseband quadrature signal;

a local oscillator phase signal selector circuit that is configured to generate first control signals that select for each switch unit of the first and second pluralities of switch units one of the four oscillator signals for encoding the baseband in-phase signal and another one of the four oscillator signals for encoding the baseband quadrature signal; and a voltage selector circuit that is configured to generate second control signals that select for each switch unit of the first and second pluralities of switch units to connect a single one of a first voltage, a second voltage, or ground to an output port of the respective switch unit based on the baseband in-phase signal and the baseband quadrature signal, wherein the second voltage is twice the first voltage.

12. The control circuit of claim 11, further comprising:

a comparator that compares a first number associated with the baseband in-phase signal with a second number associated with the baseband quadrature signal to determine a greater number of the baseband in-phase and baseband quadrature signals and a smaller number of the baseband in-phase and baseband quadrature signals.

13. The control circuit of claim 12, wherein the voltage selector circuit is further configured to:

determine whether the greater number of the baseband in-phase and baseband quadrature signals is an even or an odd number and whether the smaller number of the baseband in-phase and baseband quadrature signals is an even or an odd number;

in response to determining that the greater number of the baseband in-phase and baseband quadrature signals is an odd number:

generate N control signals of the second control signals to direct N switch units of the first plurality of switch units and corresponding N switch units of the second plurality of switch units to connect the second voltage to the output port, wherein N is equal to an integer division of the greater number of the baseband in-phase and baseband quadrature signals by two; and generate another control signal of the second control signals to direct another switch unit of the first plurality of switch units and a corresponding other switch unit of the second plurality of switch units to connect the first voltage to the output port;

in response to determining that the greater number of the baseband in-phase and baseband quadrature signals is an even number and that the smaller number of the baseband in-phase and baseband quadrature signals is an even number:

generate N control signals of the second control signals to direct N switch units of the first plurality of switch units and corresponding N switch units of the second plurality of switch units to connect the second voltage to the output port, wherein N is equal to an integer division of the greater number of the baseband in-phase and baseband quadrature signals by two;

in response to determining that the greater number of the baseband in-phase and baseband quadrature signals is an even number and that the smaller number of the baseband in-phase and baseband quadrature signals is an odd number:

generate (N−1) control signals of the second control signals to direct (N−1) switch units of the first plurality of switch units and corresponding (N−1) switch units of the second plurality of switch units to connect the second voltage to the output port, wherein N is equal to an integer division of the greater number of the baseband in-phase and baseband quadrature signals by two; and generate two other control signals of the second control signals to direct two other switch units of the first plurality of switch units and corresponding two other switch units of the second plurality of switch units to connect the first voltage to the output port; and generate all remaining control signals of the second control signals to direct all remaining switch units of the first plurality of switch units and all remaining corresponding switch units of the second plurality of switch units to connect ground to the output port.

14. The control circuit of claim 11, wherein the local oscillator phase signal selector circuit is configured to generate first control signals such that the first control signals direct each switch unit of the first and second pluralities of switch units to encode the baseband in-phase signal by selecting between two local oscillator phase signals of the four local oscillator phase signals that are phase-shifted by 180 degrees relative to each other and to encode the baseband quadrature signal by selecting between two other local oscillator phase signals of the four local oscillator phase signals that are phase-shifted by 180 degrees relative to each other and by 90 degrees relative to the two local oscillator phase signals.

15. The control circuit of claim 14, wherein the local oscillator phase signal selector circuit is configured to further generate first control signals such that the first control signals direct a switch unit of the first plurality of switch units and a corresponding switch unit of the second plurality of switch units to select a same local oscillator phase signal of the four local oscillator phase signals to cancel contribution of the switch unit and the corresponding switch unit to the radio-frequency output of the baseband in-phase signal and/or the baseband quadrature signal.

16. A method of operating a digital to analog signal conversion system having a local oscillator, a control circuit, a radio-frequency digital to analog converter circuit with first and second pluralities of switch units, and a power combiner circuit, comprising:

using the local oscillator to generate a plurality of local oscillator phase signals;

receiving a baseband in-phase (I) signal and a baseband quadrature (Q) signal at the control circuit;

generating, with the control circuit, a plurality of control signals based on the baseband in-phase signal and the baseband quadrature signal;

receiving the local oscillator phase signals and the plurality of control signals at the radio-frequency digital to analog converter circuit;

generating a positive radio-frequency signal of the baseband in-phase signal and the baseband quadrature signal in the first plurality of switch units and a negative radio-frequency signal of the baseband in-phase signal and the baseband quadrature signal in the second plurality of switch units by:

selecting in first switch units of the first plurality of switch units and corresponding second switch units in the second plurality of switch units one of a first voltage, a second voltage, or ground based on at least a first control signal of the plurality of control signals, selecting, in the first switch units of the first plurality of switch units, two local oscillator phase signals of the local oscillator phase signals based on at least a second control signal of the plurality of control signals, and selecting, in the second switch units of the second plurality of switch units, two local oscillator phase signals of the local oscillator phase signals based on at least a third control signal of the plurality of control signals; and generating, with the power combiner circuit, a radio-frequency output signal based on a combination of the positive radio-frequency signal from the first plurality of switch units and the negative radio-frequency signal from the second plurality of switch units.

17. The method of claim 16, further comprising:

comparing a first number associated with the baseband in-phase signal with a second number associated with the baseband quadrature signal to determine a greater number of the baseband in-phase and baseband quadrature signals and a smaller number of the baseband in-phase and baseband quadrature signals.

18. The method of claim 17, further comprising:

determining whether the greater number of the baseband in-phase and baseband quadrature signals is an even or an odd number and whether the smaller number of the baseband in-phase and baseband quadrature signals is an even or an odd number;

in response to determining that the greater number of the baseband in-phase and baseband quadrature signals is an odd number:

selecting the second voltage in N of the first switch units of the first plurality of switch units and corresponding N of the second switch units of the second plurality of switch units, wherein N is equal to an integer division of the greater number of the baseband in-phase and baseband quadrature signals by two; and selecting the first voltage in another one of the first switch units of the first plurality of switch units and a corresponding other one of the second switch units of the second plurality of switch units;

in response to determining that the greater number of the baseband in-phase and baseband quadrature signals is an even number and that the smaller number of the baseband in-phase and baseband quadrature signals is an even number:

selecting the second voltage in N of the first switch units of the first plurality of switch units and corresponding N of the second switch units of the second plurality of switch units, wherein N is equal to an integer division of the greater number of the baseband in-phase and baseband quadrature signals by two;

in response to determining that the greater number of the baseband in-phase and baseband quadrature signals is an even number and that the smaller number of the baseband in-phase and baseband quadrature signals is an odd number:

selecting the second voltage in (N−1) of the first switch units of the first plurality of switch units and corresponding (N−1) of the second switch units of the second plurality of switch units, wherein N is equal to an integer division of the greater number of the baseband in-phase and baseband quadrature signals by two; and selecting the first voltage in two other ones of the first switch units of the first plurality of switch units and corresponding two other ones of the second switch units of the second plurality of switch units; and selecting ground in all remaining ones of the first switch units of the first plurality of switch units and all corresponding remaining ones of the second switch units of the second plurality of switch units.

19. The method of claim 16, further comprising:

using the local oscillator to generate the plurality of local oscillator phase signals as four local oscillator phase signals that have a 25% duty cycle each and that are phase-shifted by 90 degrees relative to each other; and generating, with the power combiner circuit, the radio-frequency output signal by:

implementing a sum of a first portion of the positive radio-frequency signal and a corresponding first portion of the negative radio-frequency signal when selected local oscillator phase signals have an anti-phase relationship with each other, and implementing a difference of a second portion of the positive radio-frequency signal and a corresponding second portion of the negative radio-frequency signal when the selected local oscillator phase signals have an in-phase relationship with each other.

20. The method of claim 19, wherein generating, with the control circuit, the plurality of control signals based on the baseband in-phase signal and the baseband quadrature signal further comprises:

generating first control signals that direct first and second switch units to encode the baseband in-phase signal by selecting between two local oscillator phase signals of the four local oscillator phase signals that are phase-shifted by 180 degrees relative to each other and to encode the baseband quadrature signal by selecting between two other local oscillator phase signals of the four local oscillator phase signals that are phase-shifted by 180 degrees relative to each other and by 90 degrees relative to the two local oscillator phase signals.

\* \* \* \* \*